(12) United States Patent
Umebayashi

(10) Patent No.: US 8,110,253 B2
(45) Date of Patent: Feb. 7, 2012

(54) INK COMPOSITION

(75) Inventor: Tsutomu Umebayashi, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 714 days.

(21) Appl. No.: 12/234,982

(22) Filed: Sep. 22, 2008

(65) Prior Publication Data
US 2009/0087576 A1  Apr. 2, 2009

(30) Foreign Application Priority Data
Sep. 28, 2007  (JP) ................................. 2007-255663

(51) Int. Cl.
C08J 7/04 (2006.01)
C08J 7/18 (2006.01)
C08F 2/46 (2006.01)

(52) U.S. Cl. ...................... 427/511; 427/487; 522/26
(58) Field of Classification Search .................. 427/511, 427/487; 522/26
See application file for complete search history.

(56) References Cited

U.S. PATENT DOCUMENTS
2009/0087575 A1* 4/2009 Matsumura et al. .......... 427/487

FOREIGN PATENT DOCUMENTS
| EP | 1 688 466 A1 | 8/2006 |
|---|---|---|
| JP | 56-143202 A | 11/1981 |
| JP | 2005-512973 A | 5/2005 |
| WO | 03/033492 A1 | 4/2003 |
| WO | 2007/070689 A1 | 6/2007 |

OTHER PUBLICATIONS

European Search Report dated Jan. 16, 2009.
Bruce M. Monroe, et al., "Photoinitiators for Free-Radical-Initiated Photoimaging Systems," Chemical Reviews, 1993, p. 435-448, vol. 93.

* cited by examiner

Primary Examiner — Timothy J. Kugel
(74) Attorney, Agent, or Firm — Sughrue Mion, PLLC

(57) ABSTRACT

An ink composition is provided that includes compound A represented by Formula (I) below, compound B represented by Formula (II) below, and a polymerizable compound,

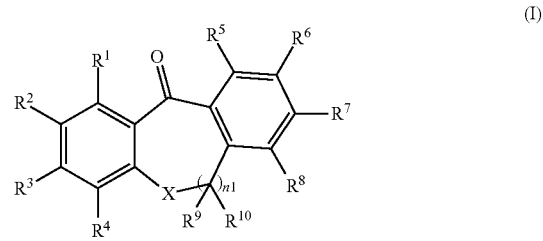

(I)

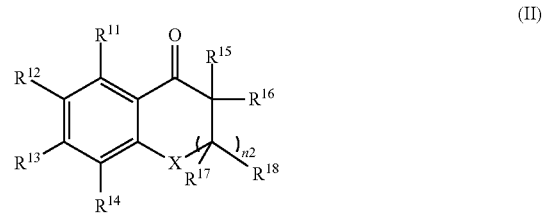

(II)

wherein, in Formula (I), X denotes O, S, or $NR^a$, n1 denotes 0 or 1, $R^a$, $R^1$, $R^2$, $R^3$, $R^4$, $R^5$, $R^6$, $R^7$, $R^8$, $R^9$, and $R^{10}$ independently denote a hydrogen atom or a monovalent substituent, and two of $R^1$, $R^2$, $R^3$, $R^4$, $R^5$, $R^6$, $R^7$, and $R^8$ that are adjacent may be linked to each other to form a ring, and in Formula (II), X denotes O, S, or $NR^b$, n2 denotes 0 or 1, $R^b$, $R^{11}$, $R^{12}$, $R^{13}$, $R^{14}$, $R^{15}$, $R^{16}$, $R^{17}$, and $R^{18}$ independently denote a hydrogen atom or a monovalent substituent, and two of $R^{11}$, $R^{12}$, $R^{13}$, and $R^{14}$ that are adjacent may be linked to each other to form a ring. There is also provided an inkjet recording method comprising (a) a step of discharging the ink composition onto a recording medium, and (b) a step of curing the ink composition by irradiating the discharged ink composition with actinic radiation.

9 Claims, 1 Drawing Sheet

INK COMPOSITION

BACKGROUND OF THE INVENTION

1. Field of the Invention

The present invention relates to an ink composition, and an inkjet recording method employing same. More particularly, it relates to an ink composition, suitable for inkjet recording, that cures with high sensitivity upon exposure to actinic radiation and gives a cured material having sufficient flexibility after the ink is cured, and to an inkjet recording method.

2. Description of the Related Art

As image recording methods for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated.

On the other hand, with regard to the inkjet system, since an image is formed directly on a recording medium by discharging an ink only on a required image area using inexpensive equipment, the ink can be used efficiently and the running cost is low. Furthermore, there is little noise and it is excellent as an image recording system.

With regard to an ink composition that is curable upon exposure to actinic radiation such as UV rays (radiation curing type ink composition), for example, an inkjet recording ink composition, there is a demand for one that cures with high sensitivity and can form an image with high image quality. By achieving high sensitivity, high curability upon exposure to actinic radiation can be imparted, and there are therefore provided various benefits such as a reduction in power consumption, a longer lifetime of an actinic radiation generator due to a decrease in the load thereon and, due to sufficient curing being achieved, suppression of evaporation of uncured low-molecular-weight material and of a reduction in the strength of an image formed.

In recent years, the UV-curing inkjet system has been attracting attention since it has relatively low odor and can record on a recording medium that does not have rapid drying properties or ink absorbing properties.

As photopolymerization initiators used in such a photopolymerization curing type ink composition, benzil, benzoin, benzoin ethyl ether, Michler's ketone, anthraquinone, acridine, phenazine, benzophenone, 2-ethylanthraquinone, etc. are generally used (ref. e.g. Bruce M. Monroe et al., Chemical Reviews, Vol. 93, p. 435-448 (1993)). However, when these general photopolymerization initiators are used, since the curing sensitivity of the photopolymerizable composition cannot be said to be sufficient, a long period of time is required for image exposure in the formation of an image, and in the case of a detailed image, if there is slight vibration during an image formation step, there is the problem that the image cannot be reproduced with good image quality. Moreover, since it is necessary to increase the total amount of energy radiated from an exposure light source, it is necessary to take into consideration the radiation of a large amount of heat generated thereby.

A method has already been proposed in which a sensitizing dye is used together with a photopolymerization initiator so as to enhance the sensitivity of a radiation curing type polymerizable compound toward radiation, and the use of various types of polymerization initiator systems has been disclosed. For example, use of a thioxanthone-based compound as a sensitizing dye has been proposed (JP-A-6-308727 and JP-A-56-143202 (JP-A denotes a Japanese unexamined patent application publication)). However, since a sensitizing dye such as a thioxanthone-based compound remains as a monomer without bonding to another compound in a cured coating after a polymerizable composition is cured, it tends to easily cause the problems of migration toward another material that is in contact with the cured coating, behaving in the same manner as a plasticizer in the cured coating due to it being a low molecular weight component to thus degrade the coating strength, or causing tackiness on the cured coating surface to thus degrade surface curing sensitivity.

In this technical field, in which an ink composition is utilized, one of the important issues is to suppress blocking between an image formed on an ink receiving layer and another material that is in contact with the image, that is, a situation caused by ink transfer from the image to the other material or undesired adhesion to the other material due to the ink. Because of this, the application of a polyfunctional thioxanthone compound having excellent anti-blocking properties to an ink composition has been proposed (e.g. JP-PCT-2005-512973 (JP-PCT denotes a published Japanese translation of a PCT application)), but the ink composition thus obtained has high viscosity and is not suitable as an inkjet ink.

BRIEF SUMMARY OF THE INVENTION

The present invention has been accomplished in the light of the above-mentioned problems, and it is an object of the present invention to provide an ink composition that can cure with high sensitivity upon exposure to low output radiation and form a high quality image, and gives an image having high anti-blocking properties in which surface tackiness is suppressed, and an inkjet recording ink and a recording method employing the ink composition.

The problems to be solved by the present invention have been solved by means described in 1) and 10) below. They are described below together with 2) to 9), which are preferred embodiments.

1) An ink composition comprising compound A represented by Formula (I) below, compound B represented by Formula (II) below, and a polymerizable compound,

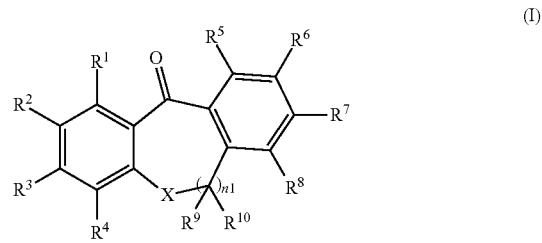

wherein X denotes O, S, or $NR^a$, n1 denotes 0 or 1, $R^a$, $R^1$, $R^2$, $R^3$, $R^4$, $R^5$, $R^6$, $R^7$, $R^8$, $R^9$, and $R^{10}$ independently denote a hydrogen atom or a monovalent substituent, and two of $R^1$, $R^2$, $R^3$, $R^4$, $R^5$, $R^6$, $R^7$, and $R^8$ that are adjacent may be linked to each other to form a ring,

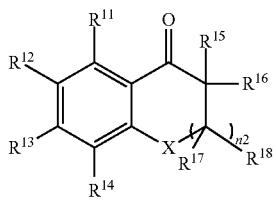
(II)

wherein X denotes O, S, or NR$^b$, n2 denotes 0 or 1, R$^b$, R$^{11}$, R$^{12}$, R$_{13}$, R$^{14}$, R$^{15}$, R$^{16}$, R$^{17}$, and R$^{18}$ independently denote a hydrogen atom or a monovalent substituent, and two of R$^{11}$, R$^{12}$, R$^{13}$, and R$^{14}$ that are adjacent may be linked to each other to form a ring, 2) the ink composition according to 1), wherein compound A represented by Formula (I) and compound B represented by Formula (II) have a light absorption maximum in the wavelength range of 300 to 400 nm, and an absorption maximum wavelength λmax (A) of compound A and an absorption maximum wavelength λmax (B) of compound B satisfy the relationship $$10 \text{ nm} < (\lambda \max(A) - \lambda \max(B)) < 50 \text{ nm},$$

where if compound A and/or compound B have two or more absorption maxima in the wavelength range of 300 to 400 nm, λmax (A) and/or λmax (B) are specified as being the absorption maximum wavelength on the longest wavelength side, 3) the ink composition according to 1), wherein the polymerizable compound is an ethylenically unsaturated compound, 4) the ink composition according to 1), wherein the polymerizable compound is a (meth)acrylic acid ester, 5) the ink composition according any one of to 1) to 4), wherein it comprises a photopolymerization initiator, 6) the ink composition according to 5), wherein the photopolymerization initiator is at least one type of compound selected from the group consisting of an acylphosphine oxide compound and an α-aminoacetophenone compound, 7) the ink composition according to any one of 1) to 6), wherein the molar concentration of compound B represented by Formula (II) contained in the ink composition is higher than the molar concentration of compound A represented by Formula (I) contained in the ink composition, 8) the ink composition according to any one of 1) to 7), wherein it comprises a colorant, 9) the ink composition according to any one of 1) to 8), wherein it is intended for use in inkjet recording, and 10) an inkjet recording method comprising (a) a step of discharging the ink composition according to any one of 1) to 9) onto a recording medium, and (b) a step of curing the ink composition by irradiating the discharged ink composition with actinic radiation.

EFFECTS OF THE INVENTION

In accordance with the present invention, by using in combination two specific types of sensitizers having different absorption maximum wavelengths an ink composition can be provided that absorbs effectively actinic radiation (UV rays) to cure with high sensitivity and, moreover, gives a cured image having little exudation and excellent anti-blocking properties, and an inkjet recording method employing the ink composition can be provided.

BEST MODE FOR CARRYING OUT THE INVENTION

Figure 1:
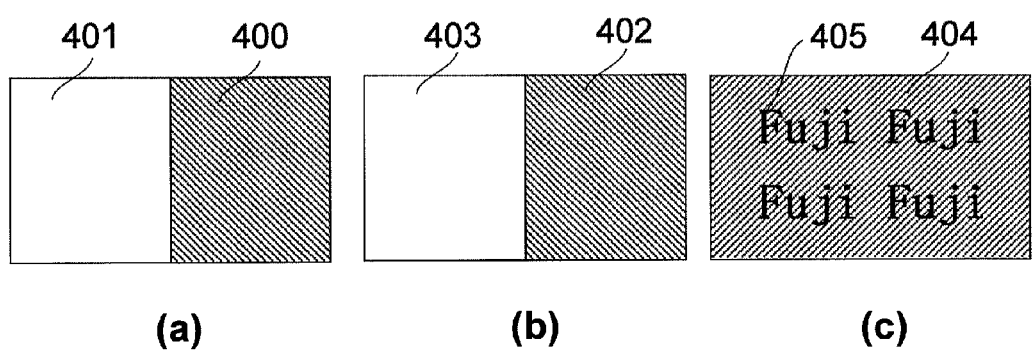
FIG. 1A, 1B, 1C are schematic drawings showing an image on a printed material used in the curability test in the Examples.

The present invention is explained in detail below.

The ink composition of the present invention comprises compound A represented by Formula (I) below, compound B represented by Formula (II) below, and a polymerizable compound as essential components,

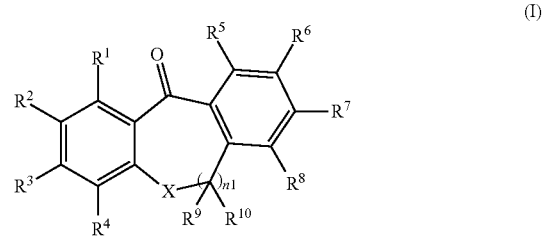
(I)

wherein X denotes O, S, or NR$^a$, n1 denotes 0 or 1, R$^a$, R$^1$, R$^2$, R$^3$, R$^4$, R$^5$, R$^6$, R$^7$, R$^8$, R$^9$, and R$^{10}$ independently denote a hydrogen atom or a monovalent substituent, and two of R$^1$, R$^2$, R$^3$, R$^4$, R$^5$, R$^6$, R$^7$, and R$^8$ that are adjacent may be linked to each other to form a ring,

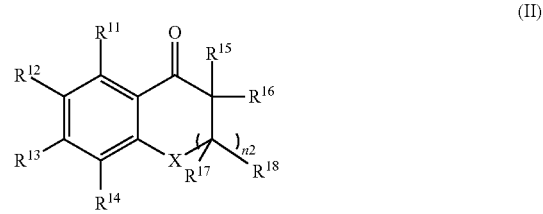
(II)

wherein X denotes O, S, or NR$^b$, n2 denotes 0 or 1, R$^b$, R$^{11}$, R$^{12}$, R$^{13}$, R$^{14}$, R$^{15}$, R$^{16}$, R$^{17}$, and R$^{18}$ independently denote a hydrogen atom or a monovalent substituent, and two of R$^{11}$, R$^{12}$, R$^{13}$, and R$^{14}$ that are adjacent may be linked to each other to form a ring.

The ink composition of the present invention uses in combination two types of sensitizers, that is, compound A represented by Formula (I) above and compound B represented by Formula (II) above.

Sensitizer

Compound A Represented by Formula (I)

Compound A represented by Formula (I) is explained below,

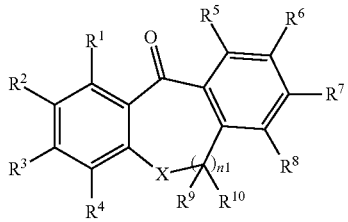

(I)

wherein X denotes O, S, or $NR^a$, and X is preferably S. $n_1$ denotes 0 or 1.

$R^a$, $R^1$, $R^2$, $R^3$, $R^4$, $R^5$, $R^6$, $R^7$, $R^8$, $R^9$, and $R^{10}$ independently denote a hydrogen atom or a monovalent substituent.

When $R^a$ denotes a monovalent substituent, $R^a$ denotes an alkyl group or an acyl group. Examples of the monovalent substituent denoted by $R^1$, $R^2$, $R^3$, $R^4$, $R^5$, $R^6$, $R^7$, $R^8$, $R^9$, and $R^{10}$ include a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a substituted sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imido group, a heterocyclothio group, a substituted sulfinyl group, a substituted phosphoryl group, an acyl group, a carboxy group, and a sulfo group. Among them, an alkyl group, a halogen atom, an alkoxy group, an alkylthio group, and a carboxy group are preferable. An alkyl group and a halogen atom are particularly preferable.

With regard to the alkyl group as the substituent denoted by $R^a$, $R^1$, $R^2$, $R^3$, $R^4$, $R^5$, $R^6$, $R^7$, $R^8$, $R^9$, and $R^{10}$ in Formula (I), those having 1 to 4 carbons such as a methyl group, an ethyl group, a propyl group, an isopropyl group, an n-butyl group, a sec-butyl group, and a t-butyl group are preferable, a methyl group, an ethyl group, a propyl group, and an isopropyl group are more preferable, and a methyl group and an ethyl group are particularly preferable.

Similarly, as the alkoxy group, those having 1 to 4 carbons such as a methoxy group, an ethoxy group, a hydroxyethoxy group, an isopropoxy group, a propoxy group, an n-butoxy group, an isobutoxy group, a sec-butoxy group, and a t-butoxy group are preferable, a methoxy group, an ethoxy group, an isopropoxy group, and a propoxy group are more preferable, and a methoxy group and an ethoxy group are particularly preferable.

Furthermore, similarly, as the halogen atom, a fluorine atom, a chlorine atom, a bromine atom, and an iodine atom can be cited, a chlorine atom, a bromine atom, and an iodine atom are more preferable, and a chlorine atom and a bromine atom are particularly preferable.

Compound B Represented by Formula (II)

Compound B represented by Formula (II) is explained below,

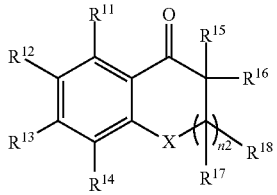

(II)

wherein X denotes O, S, or $NR^b$, and X is preferably S. $n_2$ denotes an integer of 0 or 1.

$R^b$, $R^{11}$, $R^{12}$, $R^{13}$, $R^{14}$, $R^{15}$, $R^{16}$, $R^{17}$, and $R^{18}$ independently denote a hydrogen atom or a monovalent substituent.

When $R^b$ denotes a monovalent substituent, it denotes an alkyl group or an acyl group, and more preferably an acyl group of 2-4 carbon atoms. When $R^{11}$, $R^{12}$, $R^{13}$, $R^{14}$, $R^{15}$, $R^{16}$, $R^{17}$, and $R^{18}$ denote a monovalent substituent, examples of the monovalent substituent include a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a substituted sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imido group, a heterocyclothio group, a substituted sulfinyl group, a substituted phosphoryl group, an acyl group, a carboxy group, and a sulfo group. Among them, an alkyl group, a halogen atom, an alkoxy group, an alkylthio group, and a carboxy group are more preferable. An alkyl group and a halogen atom are particularly preferable.

With regard to the alkyl group as the monovalent substituent denoted by $R^b$, $R^{11}$, $R^{12}$, $R^{13}$, $R^{14}$, $R^{15}$, $R^{16}$, $R^{17}$, and $R^{18}$ in Formula (II), those having 1 to 4 carbons such as a methyl group, an ethyl group, a propyl group, an isopropyl group, an n-butyl group, a sec-butyl group, and a t-butyl group are preferable, a methyl group, an ethyl group, a propyl group, and an isopropyl group are more preferable, and a methyl group and an ethyl group are particularly preferable.

Similarly, as the alkoxy group those having 1 to 4 carbons such as a methoxy group, an ethoxy group, a hydroxyethoxy group, an isopropoxy group, a propoxy group, an n-butoxy group, an isobutoxy group, a sec-butoxy group, and a t-butoxy group are preferable, a methoxy group, an ethoxy group, an isopropoxy group, and a propoxy group are more preferable, and a methoxy group and an ethoxy group are particularly preferable.

Furthermore, similarly, as the halogen atom a fluorine atom, a chlorine atom, a bromine atom, and an iodine atom can be cited, a chlorine atom, a bromine atom, and an iodine atom are preferable, and a chlorine atom and a bromine atom are particularly preferable.

Two of $R^{11}$, $R^{12}$, $R^{13}$, and $R^{14}$ that are adjacent may be linked, for example, condensed, with each other to form a ring.

With regard to a ring structure when they form a ring, a 5- or 6-membered aliphatic or aromatic ring can be cited as an example, it may be a heterocycle containing an element other than a carbon atom, and rings thus formed may be further combined to form a bicyclic ring, for example, a condensed ring. Moreover, these ring structures may further have a substituent such as one cited when $R^1$ to $R^8$ in Formula (I) denotes a monovalent substituent. When the ring structure thus formed is a heterocycle, examples of a heteroatom include N, O, and S.

As a sensitizer that can be used more suitably, sensitizers represented by Formula (I-A) or Formula (II-A) can be cited.

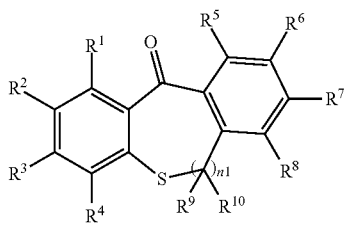

(I-A)

In Formula (I-A), $R^1$, $R^2$, $R^3$, $R^4$, $R^5$, $R^6$, $R^7$, $R^8$, $R^9$, and $R^{10}$ independently denote a hydrogen atom, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group,

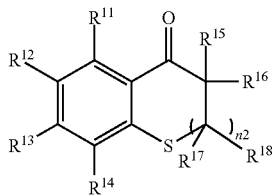

(II-A)

wherein $R^{11}$, $R^{12}$, $R^{13}$, $R^{14}$, $R^{15}$, $R^{16}$, $R^{17}$, and $R^{18}$ independently denote a hydrogen atom, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group.

Two of $R^1$, $R^2$, $R^3$, $R^4$, $R^5$, $R^6$, $R^7$, $R^8$, $R^{11}$, $R^{12}$, $R^{13}$, and $R^{14}$ that are adjacent may be linked, for example, condensed, with each other to form a ring.

With regard to a ring structure when they form a ring, a 5- or 6-membered aliphatic or aromatic ring can be cited as an example, it may be a heterocycle containing an element other than a carbon atom, and rings thus formed may be further combined to form a bicyclic ring, for example, a condensed ring. Moreover, these ring structures may further have a substituent such as one cited when $R^1$ to $R^8$ in Formula (I) denotes a monovalent substituent. When the ring structure thus formed is a heterocycle, examples of a heteroatom include N, O, and S.

As a sensitizer that can be more suitably used, sensitizers represented by Formula (I-B) or Formula (II-B) below can be cited,

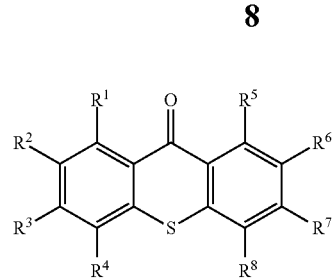

(I-B)

wherein $R^1$, $R^2$, $R^3$, $R^4$, $R^5$, $R^6$, $R^7$, $R^8$, $R^9$, and $R^{10}$ independently denote a hydrogen atom, a halogen atom, a hydroxy group, a cyano group, a nitro group, an amino group, an alkylthio group having 1 to 5 carbons, an alkylamino group having 1 to 5 carbons, an alkoxy group having 1 to 5 carbons, an alkoxycarbonyl group having 1 to 5 carbons, an acyloxy group having 2 to 5 carbons, an acyl group having 2 to 5 carbons, a carboxy group, or a sulfo group,

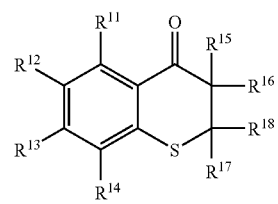

(II-B)

wherein $R^{11}$, $R^{12}$, $R^{13}$, $R^{14}$, $R^{15}$, $R^{16}$, $R^{17}$, and $R^{18}$ independently denote a hydrogen atom, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group. All of these alkyl groups are preferably lower alkyl groups, and the number of carbons is in the range of 1 to 5. The number of carbons of the acyl group and the acyloxy group is preferably in the range of 2 to 5.

Two of $R^1$, $R^2$, $R^3$, $R^4$, $R^5$, $R^6$, $R^7$, $R^8$, $R^{11}$, $R^{12}$, $R^{13}$, and $R^{14}$ that are adjacent may be linked, for example, condensed, with each other to form a ring.

With regard to a ring structure when they form a ring, a 5- or 6-membered aliphatic or aromatic ring can be cited as an example, it may be a heterocycle containing an element other than a carbon atom, and rings thus formed may be further combined to form a bicyclic ring, for example, a condensed ring. Moreover, these ring structures may further have a substituent such as one cited when $R^1$ to $R^8$ in Formula (I) denotes a monovalent substituent. When the ring structure thus formed is a heterocycle, examples of a heteroatom include N, O, and S.

As the sensitizer (II-B) that can be particularly suitably used, sensitizers represented by Formula (III) below can be cited,

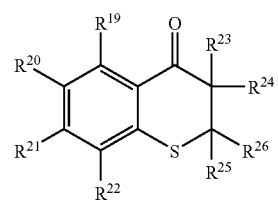

(III)

wherein $R^{19}$, $R^{20}$, $R^{21}$, $R^{22}$, $R^{23}$, $R^{24}$, $R^{25}$, and $R^{26}$ independently denote a hydrogen atom or a monovalent substituent.

Examples of the monovalent substituent when $R^{19}$, $R^{20}$, $R^{21}$, $R^{22}$, $R^{23}$, $R^{24}$, $R^{25}$, and $R^{26}$ denote a monovalent substituent include a halogen atom, an aliphatic group, an aromatic group, a heterocyclic group, a cyano group, a hydroxy group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a substituted sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imido group, a heterocyclothio group, a substituted sulfinyl group, a substituted phosphoryl group, an acyl group, a carboxy group, and a sulfo group. Among them, an alkyl group, a halogen atom, an alkoxy group, an alkylthio group, and a carboxy group are preferable. An alkyl group and a halogen atom are particularly preferable.

Two of $R^{19}$, $R^{20}$, $R^{21}$, and $R^{22}$ that are adjacent may be linked, for example, condensed, with each other to form a ring.

With regard to a ring structure when they form a ring, a 5- or 6-membered aliphatic or aromatic ring can be cited as an example, it may be a heterocycle containing an element other than a carbon atom, and rings thus formed may be further combined to form a bicyclic ring, for example, a condensed ring. Moreover, these ring structures may further have a substituent such as one cited when $R^1$ to $R^8$ in Formula (I) denotes a monovalent substituent. When the ring structure thus formed is a heterocycle, examples of a heteroatom include N, O, and S.

Specific examples of compound A that can be suitably used in the present invention include thioxanthone, 2-isopropylthioxanthone, 4-isopropylthioxanthone, 2,3-diethylthioxanthone, 2,4-diethylthioxanthone, 2,4-dichlorothioxanthone, 1-chloro-4-propoxythioxanthone, 2-cyclohexylthioxanthone, and 4-cyclohexylthioxanthone.

Specific examples of compound B that can suitably be used in the present invention (Compound Examples (I-1) to (I-127)) are listed below, but the present invention is not limited thereto. Furthermore, in the chemical structural formulae, Me denotes a methyl group, $Bu^t$ denotes a tert-butyl group, and conventional notation is otherwise followed.

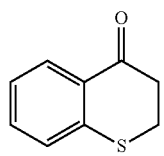
(I-1)

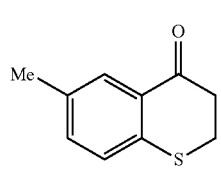
(I-2)

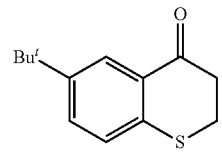
(I-3)

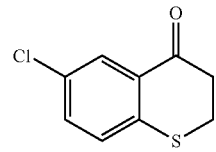
(I-4)

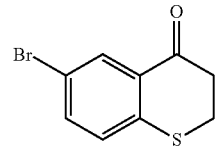
(I-5)

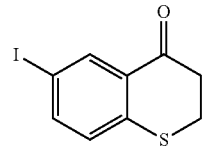
(I-6)

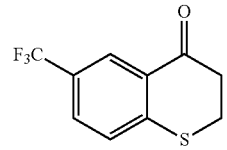
(I-7)

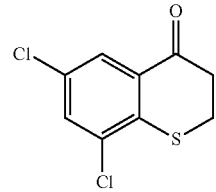
(I-8)

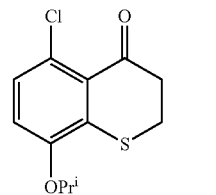
(I-9)

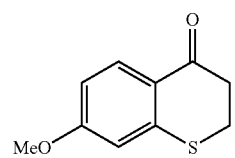
(I-10)

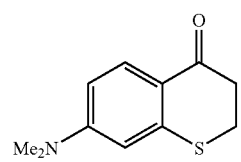
(I-11)

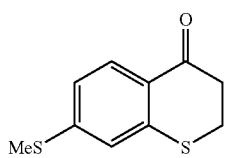 (I-12)
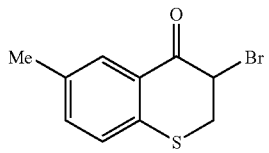 (I-13)
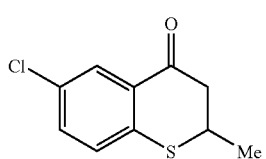 (I-14)
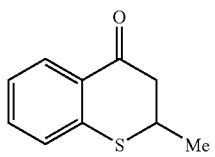 (I-15)
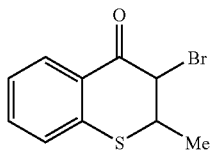 (I-16)
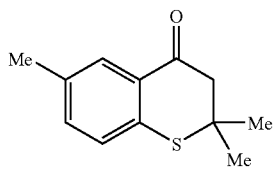 (I-17)
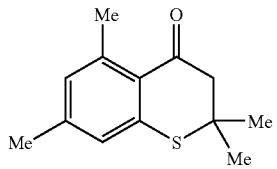 (I-18)
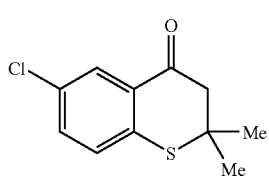 (I-19)
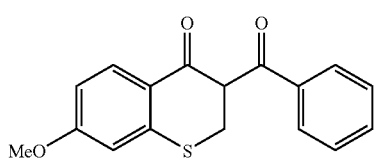 (I-20)
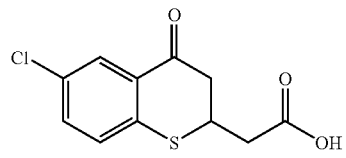 (I-21)
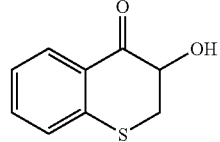 (I-22)
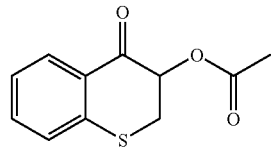 (I-23)
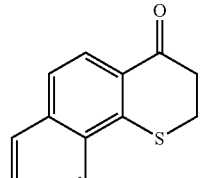 (I-24)
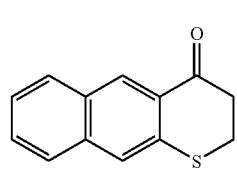 (I-25)
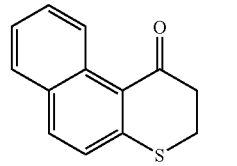 (I-26)
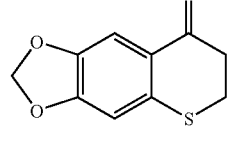 (I-27)
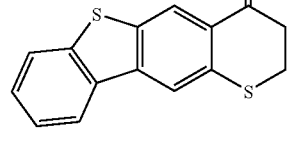 (I-28)
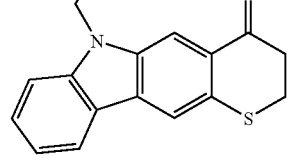 (I-29)

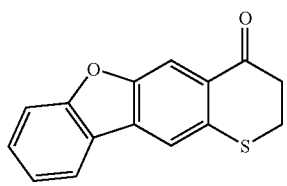
(I-30)
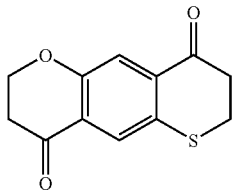
(I-31)
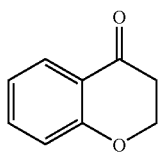
(I-32)
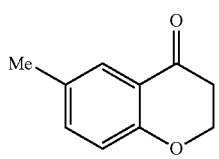
(I-33)
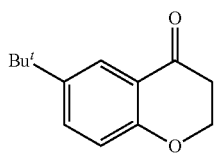
(I-34)
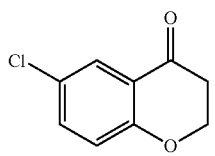
(I-35)
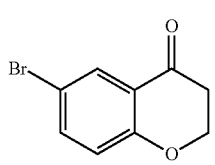
(I-36)
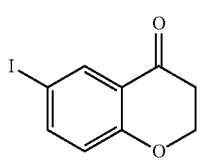
(I-37)
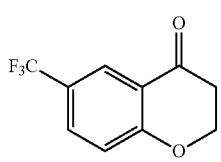
(I-38)
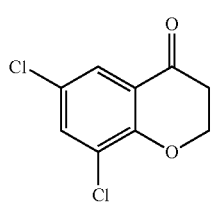
(I-39)
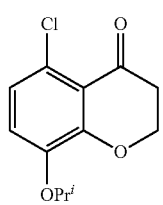
(I-40)
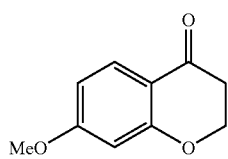
(I-41)
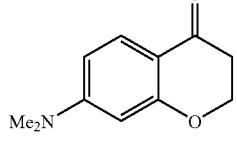
(I-42)
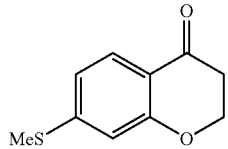
(I-43)
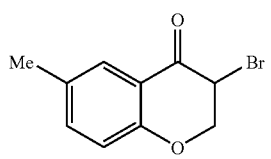
(I-44)
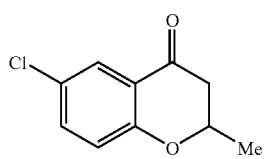
(I-45)
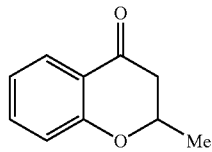
(I-46)
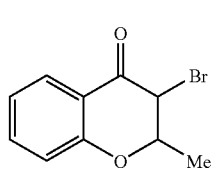
(I-47)

-continued
(I-48) 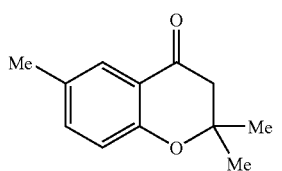
(I-49) 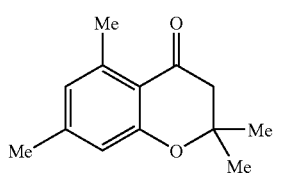
(I-50) 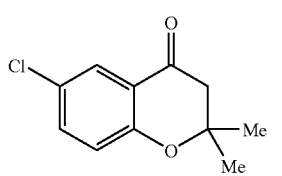
(I-51) 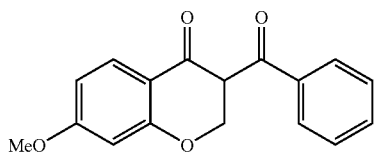
(I-52) 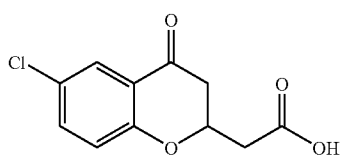
(I-53) 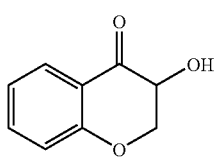
(I-54) 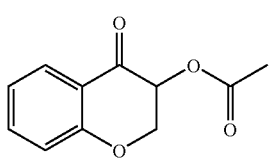
(I-55) 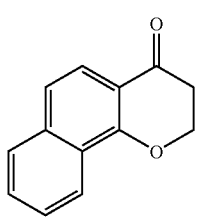
(I-56) 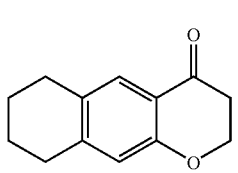
-continued
(I-57) 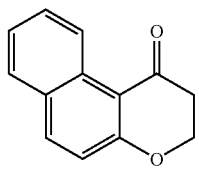
(I-58) 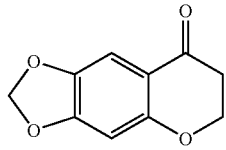
(I-59) 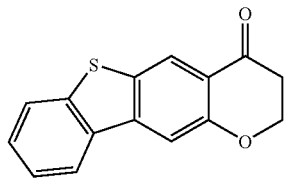
(I-60) 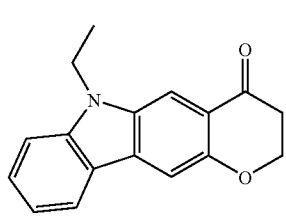
(I-61) 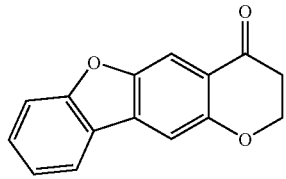
(I-62) 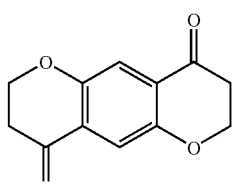
(I-63) 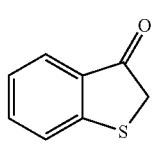
(I-64) 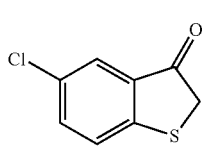
(I-65) 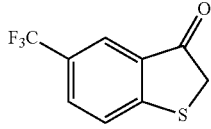

-continued
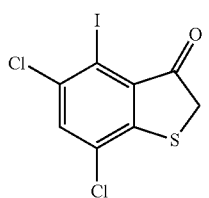 (I-66)
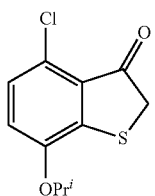 (I-67)
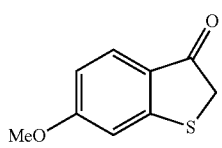 (I-68)
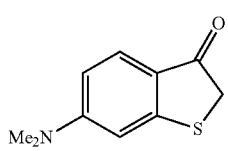 (I-69)
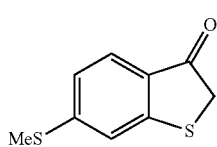 (I-70)
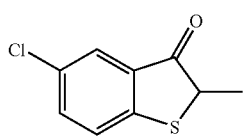 (I-71)
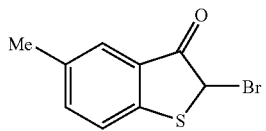 (I-72)
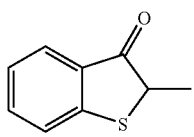 (I-73)
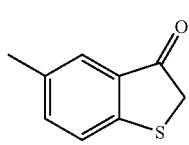 (I-74)
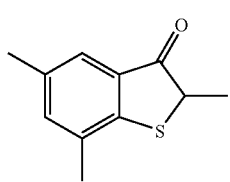 (I-75)
-continued
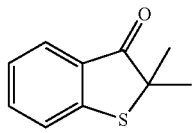 (I-76)
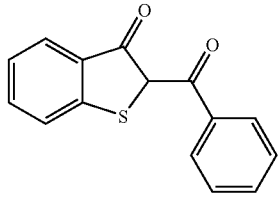 (I-77)
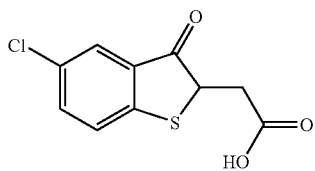 (I-78)
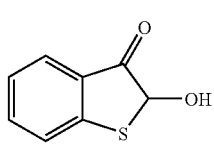 (I-79)
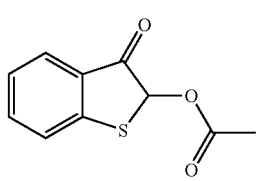 (I-80)
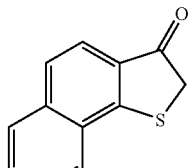 (I-81)
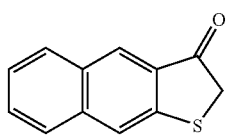 (I-82)
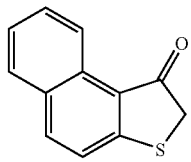 (I-83)
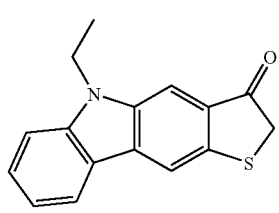 (I-84)

-continued
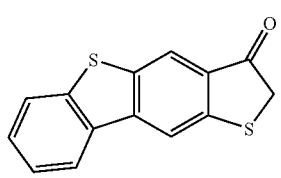 (I-85)
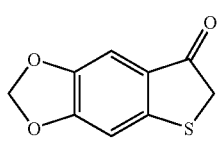 (I-86)
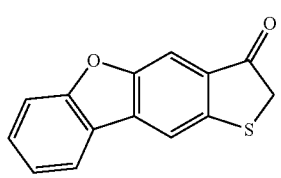 (I-87)
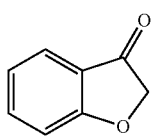 (I-88)
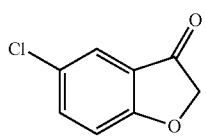 (I-89)
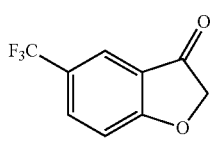 (I-90)
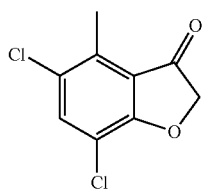 (I-91)
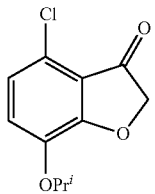 (I-92)
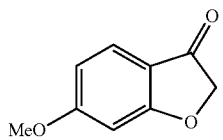 (I-93)
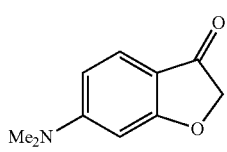 (I-94)
-continued
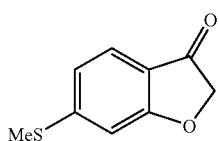 (I-95)
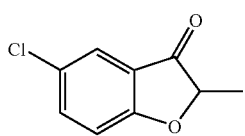 (I-96)
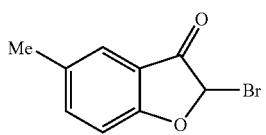 (I-97)
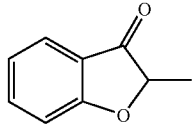 (I-98)
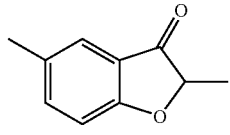 (I-99)
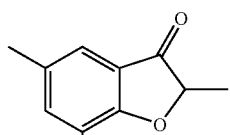 (I-100)
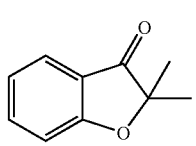 (I-101)
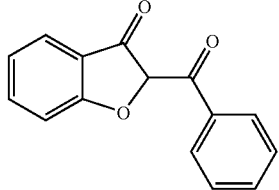 (I-102)
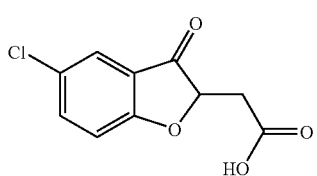 (I-103)
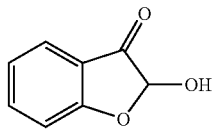 (I-104)

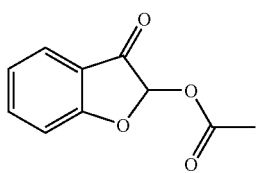
(I-105)
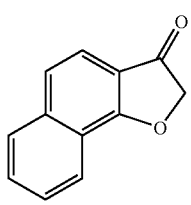
(I-106)
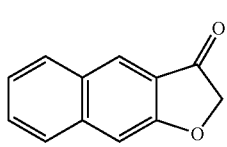
(I-107)
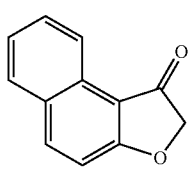
(I-108)
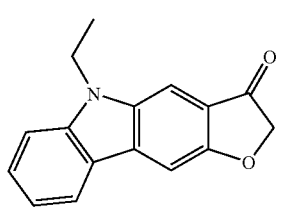
(I-109)
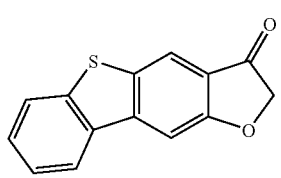
(I-110)
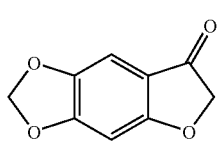
(I-111)
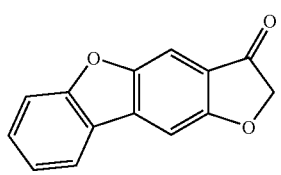
(I-112)
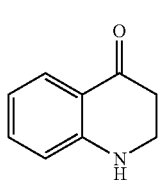
(I-113)
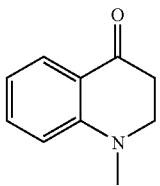
(I-114)
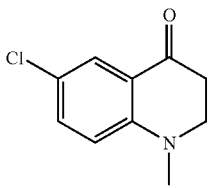
(I-115)
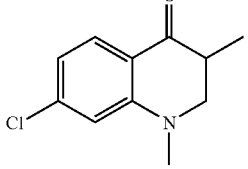
(I-116)
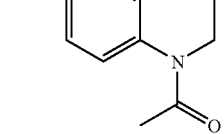
(I-117)
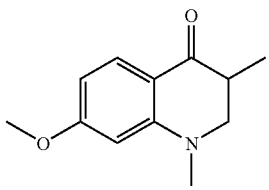
(I-118)
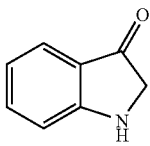
(I-119)
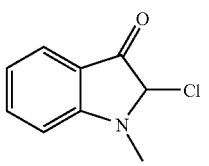
(I-120)
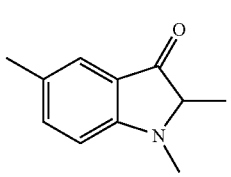
(I-121)

(I-122)
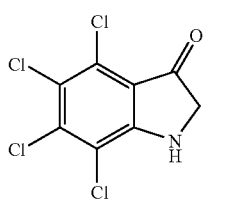

(I-123)
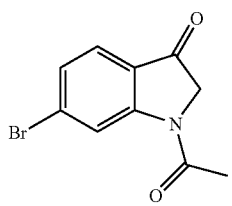

(I-124)
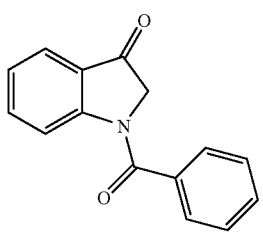

(I-125)
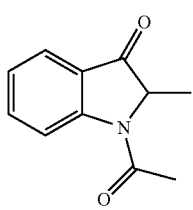

(I-126)
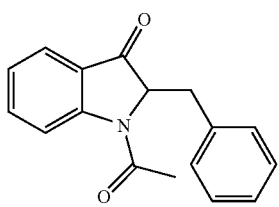

(I-127)
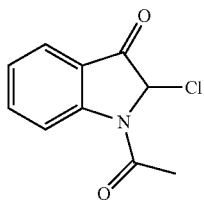

In the ink composition of the present invention, it is preferable that in a wavelength range of 300 to 400 nm light absorption maximum wavelengths of compound A and compound B satisfy requirements 1) and 2) below.
1) compound A and compound B both have a light absorption maximum in the wavelength range of 300 to 400 nm
2) an absorption maximum wavelength λmax (A) of compound A and an absorption maximum wavelength λmax (B) of compound B satisfy the relationship below:

$$10\ nm<((\lambda max(A)-\lambda max(B))<50\ nm$$

When compound A and/or compound B have two or more absorption maxima in the wavelength range of 300 to 400 nm, λmax (A) and/or λmax (B) are specified as being the absorption maximum on the longest wavelength side.

A difference λmax (A)–λmax (B) in the light absorption maxima is in the range of greater than 10 nm but less than 50 nm, and preferably in the range of 20 to 40 nm.

A combination of compound A and compound B that satisfies the above requirements is preferable since excellent curability is obtained at a lower concentration.

λmax (A) and λmax (B) may be determined by dissolving each of compound A and compound B in an appropriate common solvent, and measuring an absorption spectrum of the solution with a commercial spectrophotometer.

As a solvent for dissolving compound A and compound B, propylene glycol monomethyl ether is preferable and is used for determining the above-mentioned relationship. The concentration of compound A and compound B in the solution is preferably any concentration of 0.001 wt %, 0.01 wt %, 0.1 wt %, and 1 wt %. Furthermore, the optical path length when measuring absorbance is preferably 1 cm or 0.1 cm. As a commercial spectrophotometer, for example, a V560 spectrophotometer manufactured by JASCO Corporation may be used.

As a combination of compound A and compound B contained in the ink composition, a combination of a compound selected from the group consisting of 2-isopropylthioxanthone, 4-isopropylthioxanthone, 2,3-diethylthioxanthone, and 2,4-diethylthioxanthone as compound A and a compound selected from the group consisting of I-1, I-2, I-4, I-14, I-15, and I-19 as compound B is preferable from the viewpoint of 20 nm<(λmax (A)–λmax (B))<40 nm and there being excellent solubility for various polymerizable compounds, at least many ethylenically unsaturated compounds.

From the viewpoint of improving the sensitivity effectively, the compositional ratio of compound A represented by Formula (I) and compound B represented by Formula (II) contained in the ink composition of the present invention is preferably determined so that the λmax (A) and λmax (B) absorbances are substantially equal.

In general, since compound A has a higher molar extinction coefficient than that of compound B, with regard to the compositional ratio of compound A and compound B, it is preferable that the molar concentration of compound B contained in the ink composition is higher than the molar concentration of compound A contained in the ink composition.

The total concentration added of compound A and compound B contained in the ink composition is preferably at least 2 wt % but less than 6.5 wt % relative to the total weight of the ink composition, more preferably 2 to 6 wt %, and yet more preferably 3.3 to 5.8 wt %. It is preferable for the amount added to be in the above-mentioned range since good curability for the interior of the coating and good anti-blocking properties can be obtained.

The ink composition of the present invention comprises a polymerizable compound as an essential component.

As the polymerizable compound, a radically polymerizable compound and/or a cationically polymerizable compound may be used, and a radically polymerizable compound may preferably be used. As the cationically polymerizable compound, known epoxy compounds, oxetane compounds, and vinyl ethers may be used.

In the present invention, a radically polymerizable ethylenically unsaturated compound may preferably be used.

Radically Polymerizable Compound

The radically polymerizable compound used in the ink composition is explained.

As the polymerizable compound, various types of (meth) acrylic acid esters ((meth)acrylates) may preferably be used.

Examples thereof include monofunctional monomers such as isoamyl acrylate, stearyl acrylate, lauryl acrylate, octyl acrylate, decyl acrylate, isoamylstyl acrylate, isostearyl acrylate, 2-ethylhexyl diglycol acrylate, 2-hydroxybutyl acrylate, 2-acryloyloxyethylhexahydrophthalic acid, butoxyethyl acrylate, ethoxy diethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyloxyethylphthalic acid, 2-acryloyloxyethyl-2-hydroxyethylphthalic acid, a lactone-modified flexible acrylate, and t-butylcyclohexyl acrylate.

Furthermore, examples thereof include polyfunctional monomers such as triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, neopentyl hydroxypivalate glycol diacrylate, polytetramethylene glycol diacrylate, trimethylolpropane triacrylate, EO-modified trimethylolpropane triacrylate, pentaerythritol triacrylate, pentaerythritol tetraacrylate, dipentaerythritol hexaacrylate, ditrimethylolpropane tetraacrylate, glycerolpropoxy triacrylate, caprolactone-modified trimethylolpropane triacrylate, pentaerythritolethoxy tetraacrylate, and caprolactone-modified dipentaerythritol hexaacrylate.

In addition to the above, a polymerizable oligomer may be added in the same manner as for a monomer. Examples of the polymerizable oligomer include an epoxy acrylate, an aliphatic urethane acrylate, an aromatic urethane acrylate, a polyester acrylate, and a straight chain acrylic oligomer.

As the radically polymerizable compound constituting the ink composition, the above-mentioned radically polymerizable compounds may be used as appropriate, and from the viewpoint of flexibility and scratch resistance of a cured material being improved, the radically polymerizable compound is preferably a monofunctional cyclic (meth)acrylate, and more preferably any one of the compounds below (M-1 to M-29). Furthermore, phenoxyethyl acrylate may preferably be used.

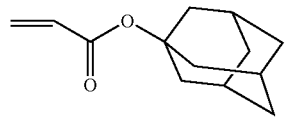
(M-1)

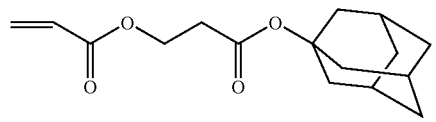
(M-2)

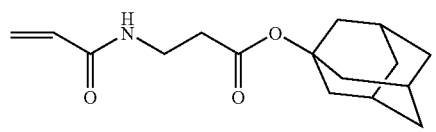
(M-3)

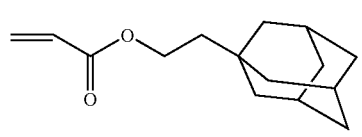
(M-4)

-continued

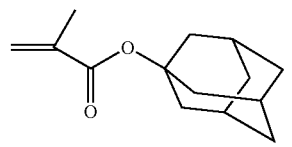
(M-5)

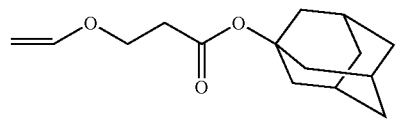
(M-6)

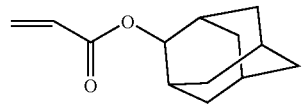
(M-7)

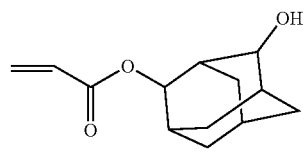
(M-8)

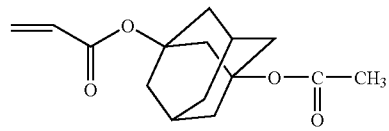
(M-9)

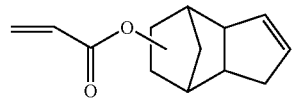
(M-10)

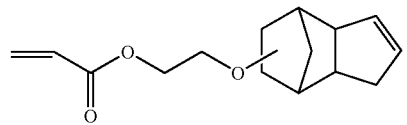
(M-11)

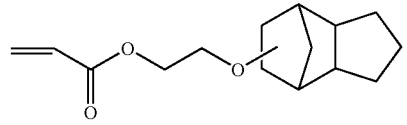
(M-12)

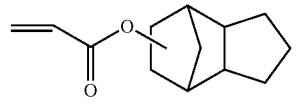
(M-13)

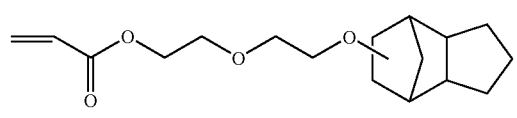
(M-14)

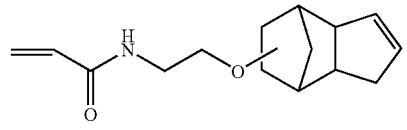
(M-15)

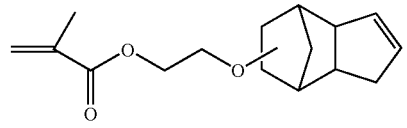
(M-16)

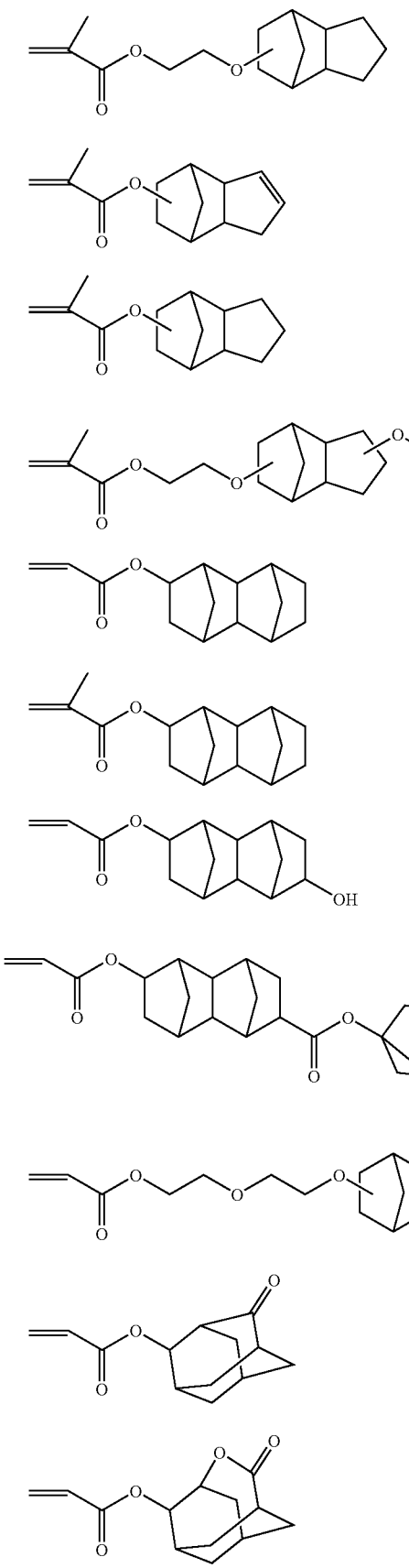

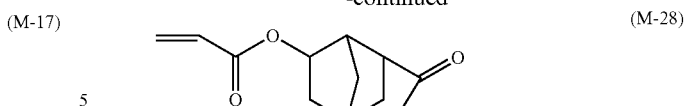

In compound M-29 above, the ethylenically unsaturated group in the alicyclic structure does not have radical polymerizability.

From the viewpoint of image fixation, the concentration of the polymerizable compound added to the ink composition of the present invention is preferably at least 40 wt % but no greater than 98 wt % relative to the total weight of the ink composition (in the present invention, 'at least 40 wt % but no greater than 95 wt %' may be expressed as '40 to 95 wt %' or '40 wt % to 95 wt %', the same applies below), more preferably 50 to 95 wt %, and yet more preferably 60 to 90 wt %. It is preferable for the amount of polymerizable compound added to be in the above-mentioned range since the curability is excellent and the viscosity is appropriate.

From the viewpoint of image fixation, the concentration of the radically polymerizable compound added to the ink composition is preferably at least 40 wt % but no greater than 98 wt % of the total weight of the ink composition, more preferably at least 50 wt % but no greater than 95 wt %, and particularly preferably at least 60 wt % but no greater than 90 wt %. It is preferable for the amount of radically polymerizable compound added to be in the above-mentioned range since the curability is excellent and the viscosity is appropriate.

The ink composition of the present invention preferably comprises a photopolymerization initiator. The concentration of photopolymerization initiator added is preferably 0.1 to 20.0 wt % of the total weight of the ink composition, more preferably 0.5 to 18.0 wt %, and yet more preferably 1.0 to 15.0 wt %. It is preferable for the amount of photopolymerization initiator added to be in the above-mentioned range since the curability is excellent and it is appropriate from the viewpoint of reduction in surface tackiness.

The concentration of the colorant added to the ink composition is preferably no greater than 50 wt % of the total weight of the ink composition, more preferably 1 to 30 wt %, and yet more preferably 2 to 20 wt %. It is preferable for the amount of colorant added to be in the above-mentioned range since good image density and storage stability are obtained.

Photopolymerization Initiator

The ink composition of the present invention preferably comprises a photopolymerization initiator.

As the photopolymerization initiator contained in the ink composition of the present invention, a known radical polymerization initiator may be used. With regard to the photopolymerization initiator that can be used in the present invention, one type thereof may be used on its own or two or more types may be used in combination.

The photopolymerization initiator that can be used in the present invention is a compound that generates a polymerization initiating species upon exposure to actinic radiation. Examples of the actinic radiation include γ rays, β rays, an electron beam, ultraviolet rays, visible light, and infrared light, and from the viewpoint of equipment cost and operational safety thereof, ultraviolet rays and visible light are preferable.

As specific photopolymerization initiators, those known to a person skilled in the art may be used, and many examples are described in Bruce M. Monroe et al, Chemical Review, 93, 435 (1993), R. S. Davidson, Journal of Photochemistry and biology A: Chemistry, 73, 81 (1993), J. P. Faussier 'Photoinitiated Polymerization-Theory and Applications': Rapra Review vol. 9, Report, Rapra Technology (1998), and M. Tsunooka et al., Prog. Polym. Sci., 21, 1 (1996). Furthermore, many compounds that are used for chemically amplified photoresists or cationic photopolymerization are described in ('Imejingu you Yukizairyou' (Organic Materials for Imaging), Ed. The Japanese Research Association for Organic Electronics Materials, Bunshin Publishing Co. (1993), pp. 187-192). Moreover, a group of compounds that undergo oxidative or reductive bond cleavage via interaction with an electronically excited state of a sensitizer, described in F. D. Saeva, Topics in Current Chemistry, 156, 59 (1990), G. G. Maslak, Topics in Current Chemistry, 168, 1 (1993)., H. B. Shuster et al., JACS, 112, 6329 (1990)., 1. D. F. Eaton et al., JACS, 102, 3298 (1980), are also known.

Acylphosphine Oxide Compound

As the acylphosphine oxide compound, a compound represented by Formula (2) below or Formula (3) below is preferable.

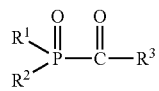

(2)

$R^1$ and $R^2$ in Formula (2) above independently denote an aliphatic group, an aromatic group, an aliphatic oxy group, an aromatic oxy group, or a heterocyclic group, and $R^3$ denotes an aliphatic group, an aromatic group, or a heterocyclic group. $R^1$ and $R^2$ above may be bonded to form a 5- to 9-membered ring. The ring structure may be a heterocycle having an oxygen atom, a nitrogen atom, a sulfur atom, etc. in the ring structure.

Examples of the aliphatic group denoted by $R^1$, $R^2$, or $R^3$ above include an alkyl group, a substituted alkyl group, an alkenyl group, a substituted alkenyl group, an alkynyl group, a substituted alkynyl group, an aralkyl group, and a substituted aralkyl group; among them an alkyl group, a substituted alkyl group, an alkenyl group, and a substituted alkenyl group, an aralkyl group, and a substituted aralkyl group are preferable, and an alkyl group and a substituted alkyl group are particularly preferable. Furthermore, the aliphatic group may be a cyclic aliphatic group or an open-chain aliphatic group. The open-chain aliphatic group may be branched.

Examples of the alkyl group include straight-chain, branched, and cyclic alkyl groups, and the number of carbon atoms of the alkyl group is preferably at least 1 but no greater than 30, and more preferably at least 1 but no greater than 20. A preferred range for the number of carbon atoms of an alkyl moiety of the substituted alkyl group is the same as in the case of the alkyl group. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, a cyclopentyl group, a neopentyl group, an isopropyl group, and an isobutyl group.

Examples of a substituent of the substituted alkyl group include —COOH (a carboxyl group), —SO₃H (a sulfo group), —CN (a cyano group), a halogen atom (e.g. a fluorine atom, a chlorine atom, a bromine atom), —OH (a hydroxy group), an alkoxycarbonyl group having no greater than 30 carbons (e.g. a methoxycarbonyl group, an ethoxycarbonyl group, a benzyloxycarbonyl group), an alkylsulfonylaminocarbonyl group having no greater than 30 carbons, an arylsulfonylaminocarbonyl group, an alkylsulfonyl group, an arylsulfonyl group, an acylaminosulfonyl group having no greater than 30 carbons, an alkoxy group having no greater than 30 carbons (e.g. a methoxy group, an ethoxy group, a benzyloxy group, a phenoxyethoxy group, a phenethyloxy group, etc), an alkylthio group having no greater than 30 carbons (e.g. a methylthio group, an ethylthio group, a methylthioethylthioethyl group, etc.), an aryloxy group having no greater than 30 carbons (e.g. a phenoxy group, a p-tolyloxy group, a 1-naphthoxy group, a 2-naphthoxy group, etc.), a nitro group, an alkoxycarbonyloxy group, an aryloxycarbonyloxy group, an acyloxy group having no greater than 30 carbons (e.g. an acetyloxy group, a propionyloxy group, etc.), an acyl group having no greater than 30 carbons (e.g. an acetyl group, a propionyl group, a benzoyl group, etc.), a carbamoyl group (e.g. a carbamoyl group, an N,N-dimethylcarbamoyl group, a morpholinocarbonyl group, a piperidinocarbonyl group, etc.), a sulfamoyl group (e.g. a sulfamoyl group, an N,N-dimethylsulfamoyl group, a morpholinosulfonyl group, a piperidinosulfonyl group, etc.), a substituted amino group (e.g. an amino group, an alkylamino group, a dialkylamino group, an arylamino group, a diarylamino group, an acylamino group, etc.), a substituted ureido group, a substituted phosphono group, and a heterocyclic group. The carboxyl group, the sulfo group, the hydroxy group, and the phosphono group may be in the form of a salt. In this case, a cation forming the salt is a group that can form a positive ion, and an organic cationic compound, a transition metal coordination complex cation (compounds described in Japanese Registered Patent No. 2791143, etc.), or a metal cation (e.g. Na⁺, K⁺, Li⁺, Ag⁺, Fe²⁺, Fe³⁺, Cu+, Cu²⁺, Zn²⁺, Al³⁺, etc.) is preferable.

Examples of the alkenyl group include straight-chain, branched, and cyclic alkenyl groups, and the number of carbon atoms of the alkenyl group is preferably at least 2 but no greater than 30, and more preferably at least 2 but no greater than 20. Furthermore, the alkenyl group may be either a substituted alkenyl group having a substituent or an unsubstituted alkenyl group, and a preferred range for the number of carbon atoms of an alkenyl moiety of the substituted alkenyl group is the same as in the case of the alkenyl group. As the substituent of the substituted alkenyl group, the same substituents as in the case of the substituted alkyl group, and an aryl group having no greater than 30 carbons (e.g. a phenyl group, a 4-chlorophenyl group, a 4-methylphenyl group, an α-naphthyl group, etc.) can be cited.

Examples of the alkynyl group include straight-chain, branched, and cyclic alkynyl groups, and the number of carbon atoms of the alkynyl group is preferably at least 2 but no greater than 30, and more preferably at least 2 but no greater than 20. The alkynyl group may be either a substituted alkynyl group having a substituent or an unsubstituted alkynyl group, and a preferred range for the number of carbon atoms of an alkynyl moiety of the substituted alkynyl group is the same as in the case of the alkynyl group. Examples of the substituent of the substituted alkynyl group include the same substituents as in the case of the substituted alkenyl group.

Examples of the aralkyl group include aralkyl groups having a straight-chain, branched, or cyclic alkyl side chain, and the number of carbon atoms of the aralkyl group is preferably at least 7 but no greater than 35, and more preferably at least 7 but no greater than 25. The aralkyl group may be either a substituted aralkyl group having a substituent or an unsubstituted aralkyl group, and a preferred range for the number of carbon atoms of an aralkyl moiety of the substituted aralkyl group is the same as in the case of the aralkyl group. Examples of the substituent of the substituted aralkyl group include the same substituents as in the case of the substituted alkenyl group. Furthermore, an aryl moiety of the aralkyl group may have a substituent, and examples of the substituent include the same substituents as in the case of the alkyl group, and straight-chain, branched, and cyclic alkyl groups having no greater than 30 carbons.

Examples of the aromatic group denoted by $R^1$, $R^2$, or $R^3$ above include an aryl group and a substituted aryl group. The number of carbon atoms of the aryl group is preferably at least 6 but no greater than 30, and more preferably at least 6 but no greater than 20. A preferred range for the number of carbon atoms of an aryl moiety of the substituted aryl group is the same as that for the aryl group. Examples of the aryl group include a phenyl group, an α-naphthyl group, and a β-naphthyl group. Examples of a substituent of the substituted aryl group include the same substituents as in the case of the substituted alkyl group, and straight-chain, branched, and cyclic alkyl groups having no greater than 30 carbons.

The aliphatic oxy group denoted by $R^1$ or $R^2$ above is preferably an alkoxy group having at least 1 but no greater than 30 carbons, and examples thereof include a methoxy group, an ethoxy group, a butoxy group, an octyloxy group, and a phenoxyethoxy group. However, the examples are not limited thereto.

The aromatic oxy group denoted by $R^1$ or $R^2$ above is preferably an aryloxy group having at least 6 but no greater than 30 carbons, and examples thereof include a phenoxy group, a methylphenyloxy group, a chlorophenyloxy group, a methoxyphenyloxy group, and an octyloxyphenyloxy group. However, the examples are not limited thereto.

The heterocyclic group denoted by $R^1$, $R^2$ or $R^3$ above is preferably a heterocyclic group containing an N, O, or S atom, and examples thereof include a pyridyl group, a furyl group, a thienyl group, an imidazolyl group, and a pyrrolyl group.

Furthermore, the compound represented by Formula (2) may form a multimer having 2 or more acylphosphine structures by bonding to another compound represented by Formula (2) via $R^1$, $R^2$ or $R^3$.

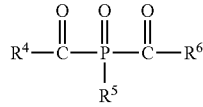

(3)

$R^4$ and $R^6$ in Formula (3) above independently denote an alkyl group, an aryl group, or a heterocyclic group, and $R^5$ denotes an alkyl group, an aryl group, an alkoxy group, an aryloxy group, or a heterocyclic group.

The alkyl group, aryl group, heterocyclic group, alkoxy group, and aryloxy group denoted by $R^4$, $R^5$ or $R^6$ above may have a substituent, and examples of the substituent include the same substituents as in the case of Formula (2) above.

The alkyl group, aryl group, heterocyclic group, alkoxy group, and aryloxy group in Formula (3) above have the same meanings as those in Formula (2) above.

Furthermore, the compound represented by Formula (3) may form a multimer having 2 or more acylphosphine structures by bonding to another compound represented by Formula (3) via $R^4$, $R^5$ or $R^6$.

The compound represented by Formula (2) above is preferably a compound represented by Formula (4) below,

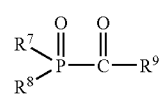

(4)

wherein $R^7$ and $R^8$ independently denote a phenyl group, a methoxy group, or an isopropoxy group, and $R^9$ denotes a 2,4,6-trimethylphenyl group, a 2,4-dimethylphenyl group, a 2-methylphenyl group (o-toluyl group), an isobutyl group, or a t-butyl group.

The compound represented by Formula (3) above is preferably a compound represented by Formula (5) below,

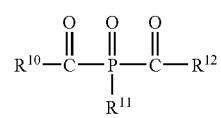

(5)

wherein $R^{10}$ and $R^{12}$ independently denote a 2,4,6-trimethylphenyl group, a 2,6-dimethylphenyl group, or a 2,6-dimethoxyphenyl group, and $R^{11}$ denotes a phenyl group or a 2,4,4-trimethylpentyl group.

Examples of the acylphosphine oxide compound represented by Formula (2) or (3) above include compounds described in JP-B-63-40799 (JP-B denotes a Japanese examined patent application publication), JP-B-5-29234, JP-A-10-95788, and JP-A-10-29997.

Specific examples of the acylphosphine oxide compound include the compounds below (Compound Examples (P-1) to (P-26)), but in the present invention the examples are not limited thereto.

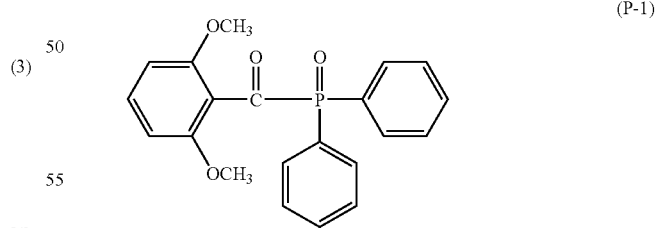

(P-1)

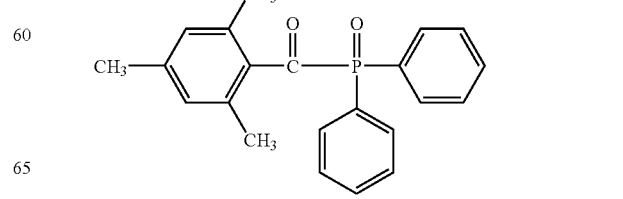

(P-2)

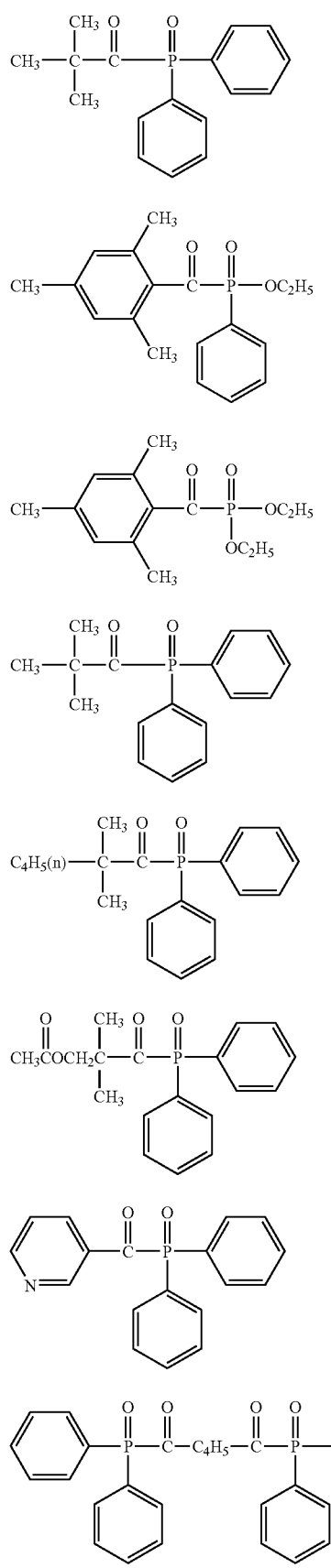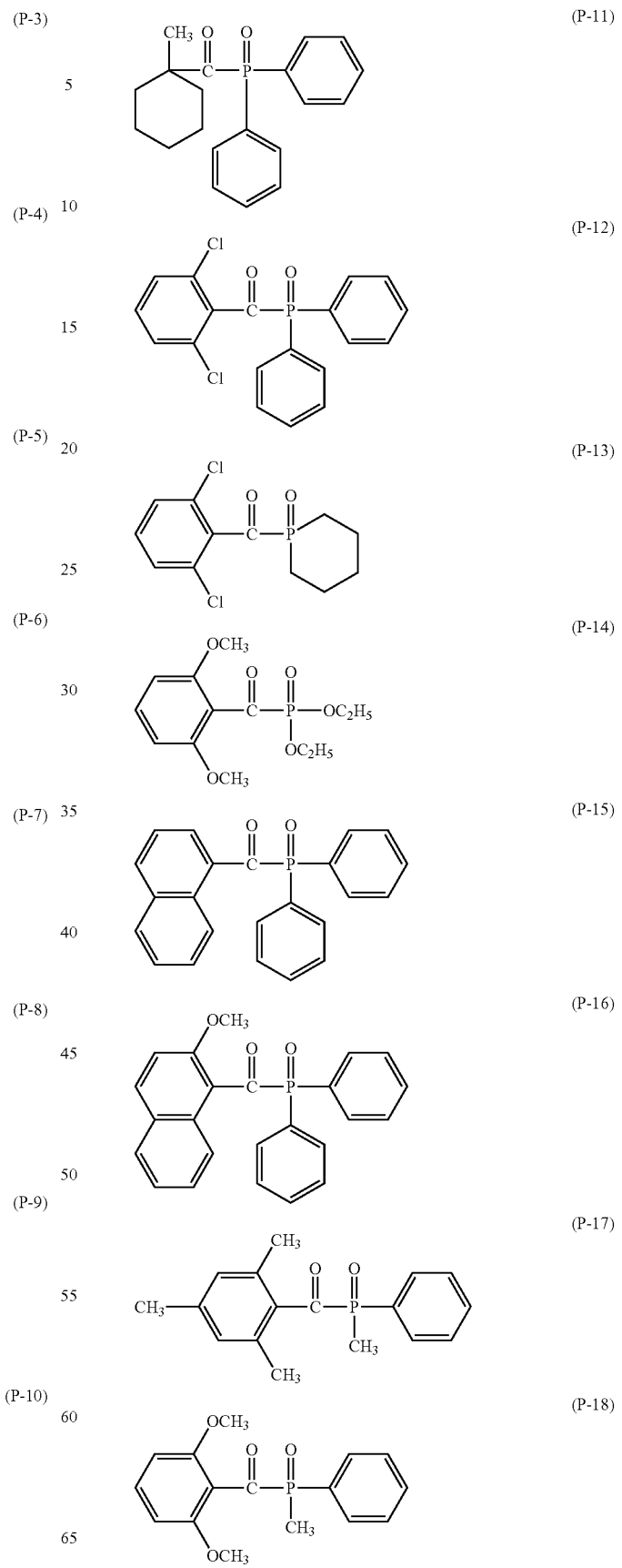

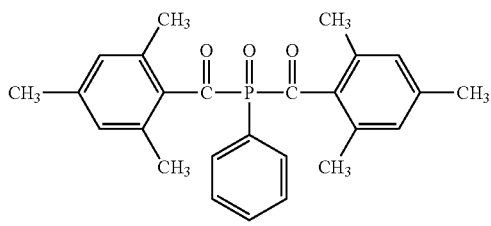
(P-19)

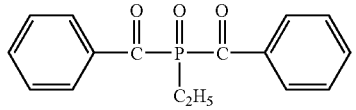
(P-20)

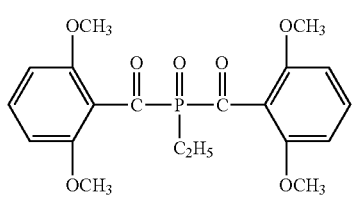
(P-21)

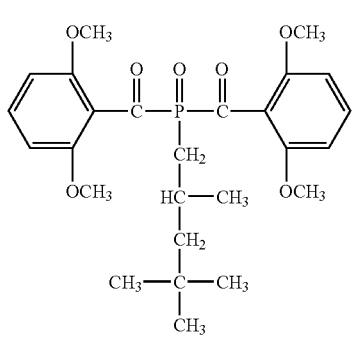
(P-22)

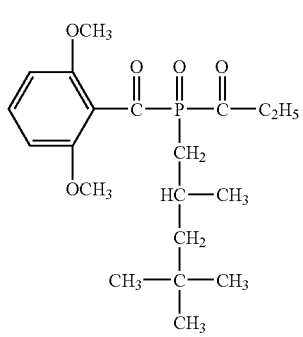
(P-23)

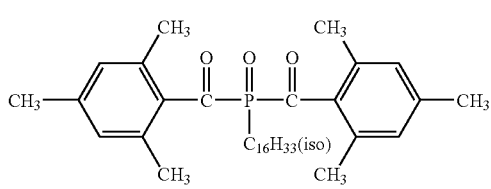
(P-24)

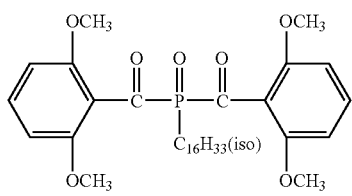
(P-25)

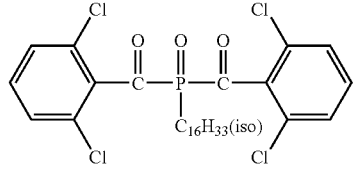
(P-26)

As the acylphosphine oxide compound, a monoacylphosphine oxide compound, a bisacylphosphine oxide compound, etc. may be used, and as the monoacylphosphine oxide compound, a known monoacylphosphine oxide compound may be used. Examples thereof include monoacylphosphine oxide compounds described in JP-B-60-8047 and JP-B-63-40799. Specific examples thereof include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluylphenylphosphinate, methyl o-toluylphenylphosphinate, methyl 2,4-dimethylbenzoylphenylphosphinate, isopropyl p-tert-butylbenzoylphenylphosphinate, methyl acryloylphenylphosphinate, isobutyryldiphenylphosphine oxide, 2-ethylhexanoyidiphenylphosphine oxide, o-toluyidiphenylphosphine oxide, p-tert-butylbenzoyldiphenylphosphine oxide, 3-pyridylcarbonyldiphenylphosphine oxide, acryloyldiphenylphosphine oxide, benzoyidiphenylphosphine oxide, vinyl pivaloylphenylphosphinate, adipoylbisdiphenylphosphine oxide, pivaloyldiphenylphosphine oxide, p-toluyidiphenylphosphine oxide, 2-methylbenzoyidiphenylphosphine oxide, 2-methyl-2-ethylhexanoyldiphenylphosphine oxide, 1-methylcyclohexanoyidiphenylphosphine oxide, methyl pivaloylphenylphosphinate, and isopropyl pivaloylphenylphosphinate.

As the bisacylphosphine oxide compound, a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, in the present invention, as the acylphosphine oxide compound, bis(2,4,6-trimethylbenzoyl)phenylphosphine oxide (IRGACURE 819: Ciba Specialty Chemicals), bis(2,6-dimethoxybenzoyl)-2,4,4-trimethylpentylphenylphosphine oxide, 2,4,6-trimethylbenzoyldiphenylphosphine oxide (DAROCUR TPO: Ciba Specialty Chemicals, LUCIRIN TPO: BASF), etc. are preferable.

α-Aminoacetophenone Compound

With regard to the α-aminoacetophenone compound, one type thereof may be used on its own, or two or more types thereof may be used in combination.

As the α-aminoacetophenone compound, a compound represented by Formula (1) below may be used preferably,

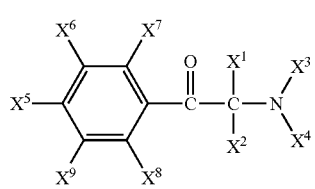

(1)

wherein $X^1$ denotes a group represented by (a), (b) or (c),

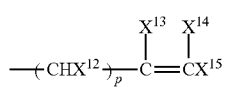

(a)

wherein p is 0 or 1,

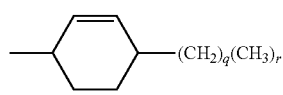

(b)

wherein q is an integer of 0 to 3, and r is 0 or 1,

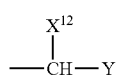

(c)

wherein Y denotes a hydrogen atom, a halogen atom, an OH group, an alkyl group having at least 1 but no greater than 12 carbons (unless otherwise specified, an alkyl group means a straight-chain or branched alkyl group, and the same applies below), an alkoxy group having at least 1 but no greater than 12 carbons, an aromatic group, or a heterocyclic group. Preferred examples of the aromatic group include a phenyl group and a naphthyl group. Preferred examples of the heterocyclic group include a furyl group, a thienyl group, and a pyridyl group.

The alkyl group, alkoxy group, aromatic group, and heterocyclic group denoted by Y may have a substituent.

Examples of the substituent that the alkyl group denoted by Y may have include an OH group, a halogen atom, —N($X^{10}$)$_2$ (the two $X^{10}$s independently denote a hydrogen atom, an alkyl group having at least 1 but no greater than 8 carbons, an alkenyl group having at least 3 but no greater than 5 carbons, a phenylalkyl group having at least 7 but no greater than 9 carbons, a hydroxyalkyl group having at least 1 but no greater than 4 carbons, or a phenyl group), an alkoxy group having at least 1 but no greater than 12 carbons, —COOR (R denotes an alkyl group having at least 1 but no greater than 18 carbons), —CO(OCH$_2$OCH$_2$)$_n$OCH$_3$ (n denotes an integer of at least 1 but no greater than 20), and —OCOR (R denotes an alkyl group having at least 1 but no greater than 4 carbons).

Examples of the substituent that the alkoxy group denoted by Y may have include —COOR (R denotes an alkyl group having at least 1 but no greater than 18 carbons) and —CO(OCH$_2$CH$_2$)$_n$OCH$_3$ (n denotes an integer of at least 1 but no greater than 20).

Examples of the substituent that the aromatic group or heterocyclic group denoted by Y may have include —(OCH$_2$CH$_2$)$_n$OH (n denotes an integer of at least 1 but no greater than 20), —(OCH$_2$CH$_2$)$_n$OCH$_3$ (n denotes an integer of at least 1 but no greater than 20), an alkylthio group having at least 1 but no greater than 8 carbons, a phenoxy group, —COOR (R denotes an alkyl group having at least 1 but no greater than 18 carbons), —CO(OCH$_2$CH$_2$)$_n$OCH$_3$ (n denotes an integer of at least 1 but no greater than 20), a phenyl group, and a benzyl group.

Two or more of these substituents may be present when this is possible, and the substituent may be further substituted when this is possible.

Furthermore, in the formula, $X^{12}$ denotes a hydrogen atom, an alkyl group having at least 1 but no greater than 8 carbons, or a phenyl group. $X^{13}$, $X^{14}$, and $X^{15}$ independently denote a hydrogen atom, or an alkyl group having at least 1 but no greater than 4 carbons. $X^{13}$ and $X^{14}$ may be bridged to form an alkylene group having at least 3 but no greater than 7 carbons.

In the formula (1), $X^2$ denotes the same group as for $X^1$ above, a cycloalkyl group having 5 or 6 carbons, an alkyl group having at least 1 but no greater than 12 carbons, or a phenyl group.

The alkyl group and the phenyl group denoted by $X^2$ may have a substituent.

Examples of the substituent that the alkyl group denoted by $X^2$ may have include an alkoxy group having at least 1 but no greater than 4 carbons, a phenoxy group, a halogen atom, and a phenyl group.

Examples of the substituent that the phenyl group denoted by $X^2$ may have include a halogen atom, an alkyl group having at least 1 but no greater than 12 carbons, and an alkoxy group having at least 1 but no greater than 4 carbons.

Two or more of these substituents may be present when this is possible, and the substituent may be further substituted when this is possible.

Furthermore, in the formula, $X^1$ and $X^2$ may be bridged to form a group represented by the following formulae.

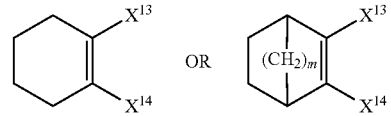

In the formulae, $X^{13}$ denotes a hydrogen atom, an alkyl group having at least 1 but no greater than 12 carbons, an alkenyl group having at least 3 but no greater than 5 carbons, a cycloalkyl group having at least 5 but no greater than 12 carbons, or a phenylalkyl group having at least 7 but no greater than 9 carbons.

The alkyl group, alkenyl group, cycloalkyl group, and phenylalkyl group denoted by $X^{13}$ may have a substituent, and examples of the substituent include an OH group, an alkoxy group having at least 1 but no greater than 4 carbons, —CN, and —COOR (R denotes an alkyl group having at least 1 but no greater than 4 carbons).

In the formulae, $X^{14}$ denotes an alkyl group having at least 1 but no greater than 12 carbons, an alkenyl group having at least 3 but no greater than 5 carbons, a cycloalkyl group having at least 5 but no greater than 12 carbons, a phenylalkyl group having at least 7 but no greater than 9 carbons, or a phenyl group.

The alkyl group, alkenyl group, cycloalkyl group, phenylalkyl group, and phenyl group denoted by $X^{14}$ may have a substituent.

Examples of the substituent that the alkyl group, alkenyl group, cycloalkyl group, and phenylalkyl group denoted by $X^{14}$ may have include an OH group, an alkoxy group having at least 1 but no greater than 4 carbons, —CN, and —COOR (R denotes an alkyl group having at least 1 but no greater than 4 carbons). Furthermore, when the alkyl group denoted by $X^{14}$ has a substituent, the number of carbons in the alkyl group that is substituted is preferably at least 2 but no greater than 4.

Examples of the substituent that the phenyl group denoted by $X^{14}$ may have include a halogen atom, an alkyl group having at least 1 but no greater than 12 carbons, an alkoxy group having at least 1 but no greater than 4 carbons, and —COOR (R denotes an alkyl group having at least 1 but no greater than 4 carbons).

$X^{13}$ and $X^{14}$ may be bridged to form an alkylene group having at least 1 but no greater than 7 carbons, a phenylalkylene group having at least 7 but no greater than 10 carbons, an o-xylylene group, a 2-butenylene group, or an oxa- or aza-alkylene group having 2 or 3 carbons.

Furthermore, $X^{13}$ and $X^{14}$ may be bridged to form an alkylene group having at least 3 but no greater than 7 carbons.

The alkylene group formed by bridging $X^{13}$ and $X^{14}$ may have as a substituent an OH group, an alkoxy group having at least 1 but no greater than 4 carbons, or —COOR (R denotes an alkyl group having at least 1 but no greater than 4 carbons), and may contain in its bonding —O—, —S—, —CO—, or —N($X^{16}$)— ($X^{16}$ denotes a hydrogen atom, an alkyl group having at least 1 but no greater than 12 carbons, or an alkyl group having at least 1 but no greater than 12 carbons and containing in its bonding chain one or more —O—, alkenyl group having at least 3 but no greater than 5 carbons, phenylalkyl group having at least 7 but no greater than 9 carbons, hydroxyalkyl group having at least 1 but no greater than 4 carbons, —CH$_2$CH$_2$CN, —CH$_2$CH$_2$COOR (R denotes an alkyl group having at least 1 but no greater than 4 carbons), alkanoyl group having at least 2 but no greater than 8 carbons, or benzoyl group).

In the formula, $X^5$, $X^6$, $X^7$, $X^8$, and $X^9$ independently denote a hydrogen atom, a halogen atom, an alkyl group having at least 1 but no greater than 12 carbons, a cycloalkyl group having 5 or 6 carbons, a phenyl group, a benzyl group, a benzoyl group, an —O$X^{17}$ group, an —S$X^{18}$ group, an —SO—$X^{18}$ group, an —SO$_2$—$X^{18}$ group, an —N($X^{19}$)($X^{20}$) group, an —NH—SO$_2$—$X^{21}$ group, or a group represented by the following formula,

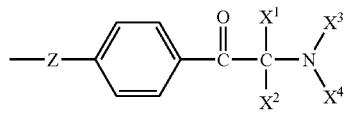

wherein Z denotes —O—, —S—, —N($X^{10}$)—$X^{11}$—N ($X^{10}$)—, or a group represented by the following formula. $X^1$, $X^2$, $X^3$ and $X^4$ have the same meanings as those of Formula (1) above.

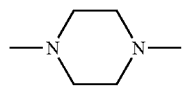

In the formula, $X^{10}$ denotes the same as above, and $X^{11}$ denotes a straight-chain or branched alkylene group having at least 2 but no greater than 16 carbons, or a straight-chain or branched alkylene group having at least 2 but no greater than 16 carbons and containing in a chain one or more —O—, —S—, or —N($X^{10}$)— ($X^{10}$ is the same as above).

$X^{17}$ denotes a hydrogen atom, an alkyl group having at least 1 but no greater than 12 carbons, —(CH$_2$CH$_2$O)$_n$H (n is an integer of at least 2 but no greater than 20), an alkanoyl group having at least 2 but no greater than 8 carbons, an alkenyl group having at least 3 but no greater than 12 carbons, a cyclohexyl group, a hydrocyclohexyl group, a phenyl group, a phenylalkyl group having at least 7 but no greater than 9 carbons, or —Si($R^4$)$_r$($R^5$)$_{3-r}$ ($R^4$ is an alkyl group having at least 1 but no greater than 8 carbons, $R^5$ is a phenyl group, and r is 1, 2, or 3).

The alkyl group and the phenyl group denoted by $X^{17}$ may have a substituent.

Examples of the substituent that the alkyl group denoted by $X^{17}$ may have include —CN, —OH, an alkoxy group having at least 1 but no greater than 4 carbons, an alkenyloxy group having at least 3 but no greater than 6 carbons, —OCH$_2$CH$_2$CN, —CH$_2$CH$_2$COOR (R denotes an alkyl group having at least 1 but no greater than 4 carbons), —COOH, and —COOR (R denotes an alkyl group having at least 1 but no greater than 4 carbons). Furthermore, when the alkyl group denoted by $X^{17}$ has a substituent, the number of carbons in the alkyl group that is substituted is preferably at least 1 but no greater than 6.

Examples of the substituent that the phenyl group denoted by $X^{17}$ may have include a halogen atom, an alkyl group having at least 1 but no greater than 12 carbons, and an alkoxy group having at least 1 but no greater than 4 carbons.

$X^{18}$ denotes a hydrogen atom, an alkyl group having at least 1 but no greater than 12 carbons, an alkenyl group having at least 3 but no greater than 12 carbons, a cyclohexyl group, a phenyl group, or a phenylalkyl group having at least 7 but no greater than 9 carbons.

The alkyl group and the phenyl group denoted by $X^{18}$ may have a substituent.

Examples of the substituent that the alkyl group denoted by $X^{18}$ may have include —SH, —OH, —CN, —COOR (R denotes an alkyl group having at least 1 but no greater than 4 carbons), an alkoxy group having at least 1 but no greater than 4 carbons, —OCH$_2$CH$_2$CN, and —OCH$_2$CH$_2$COOR (R denotes an alkyl group having at least 1 but no greater than 4 carbons).

Examples of the substituent that the phenyl group denoted by $X^{18}$ may have include a halogen atom, an alkyl group having at least 1 but no greater than 12 carbons, and an alkoxy group having at least 1 but no greater than 4 carbons.

$X^{19}$ and $X^{20}$ independently denote a hydrogen atom; an alkyl group having at least 1 but no greater than 12 carbons; a hydroxyalkyl group having at least 2 but no greater than 4 carbons; an alkoxyalkyl group having at least 2 but no greater than 10 carbons; an alkenyl group having at least 3 but no greater than 5 carbons; a cycloalkyl group having at least 5 but no greater than 12 carbons; a phenylalkyl group having at least 7 but no greater than 9 carbons; a phenyl group; a phenyl group substituted with a halogen atom, an alkyl group having at least 1 but no greater than 12 carbons, or an alkoxy group having at least 1 but no greater than 4 carbons; an alkanoyl group having 2 or 3 carbons; or a benzoyl group. Furthermore, $X^{19}$ and $X^{20}$ may be bridged to form an alkylene group having at least 2 but no greater than 8 carbons, or an alkylene group that has at least 2 but no greater than 8 carbons and is substituted with an OH group, an alkoxy group having at least 1 but no greater than 4 carbons, or a —COOR group (R is an alkyl group having at least 1 but no greater than 4 carbons); or an alkylene group having at least 2 but no greater than 8 carbons and containing in a bonding chain —O—, —S—, or —N($X^{16}$)— ($X^{16}$ is the same as above).

$X^{21}$ denotes an alkyl group having at least 1 but no greater than 18 carbons; a phenyl group; a naphthyl group; or a phenyl group or naphthyl group substituted with a halogen atom, an alkyl group having at least 1 but no greater than 12 carbons, or an alkoxy group having at least 1 but no greater than 8 carbons.

Formula (1) is preferably represented by Formula (d),

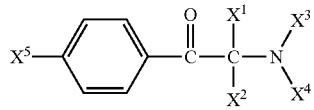

(d)

wherein $X^1$ and $X^2$ independently denote a methyl group, an ethyl group, or a benzyl group, —$NX^3X^4$ denotes a dimethylamino group, a diethylamino group, or a morpholino group, and $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group. Among them, —$NX^3X^4$ is preferably a dimethylamino group or a morpholino group.

Furthermore, as the α-aminoacetophenone compound, an acid adduct salt of a compound represented by Formula (1) above may be used.

Moreover, examples of commercial α-aminoacetophenone compounds include polymerization initiators available under the product names IRGACURE 907, IRGACURE 369, and IRGACURE 379 manufactured by Ciba Specialty Chemicals.

Specific examples of the α-aminoacetophenone compound include 2-dimethylamino-2-methyl-1-phenylpropan-1-one, 2-diethylamino-2-methyl-1-phenylpropan-1-one, 2-methyl-2-morpholino-1-phenylpropan-1-one, 2-dimethylamino-2-methyl-1-(4-methylphenyl)propan-1-one, 2-dimethylamino-1-(4-ethylphenyl)-2-methylpropan-1-one, 2-dimethylamino-1-(4-isopropylphenyl)-2-methylpropan-1-one, 1-(4-butylphenyl)-2-dimethylamino-2-methylpropan-1-one, 2-dimethylamino-1-(4-methoxyphenyl)-2-methylpropan-1-one, 2-dimethylamino-2-methyl-1-(4-methylthiophenyl) propan-1-one, 2-methyl-1-(4-methylthiophenyl)-2-morpholinopropan-1-one (IRGACURE 907), 2-benzyl-2-dimethylamino-1-(4-morpholinophenyl)butan-1-one (IRGACURE 369), 2-benzyl-2-dimethylamino-1-(4-dimethylaminophenyl)butan-1-one, and 2-dimethylamino-2-[(4-methylphenyl)methyl]-1-[4-(4-morpholinyl)phenyl]-1-butanone (IRGACURE 379).

Other Photopolymerization Initiator

The ink composition may comprise another photopolymerization initiator. With regard to a polymerization initiator, it is preferable for it to comprise a radical polymerization initiator. Examples of other polymerization initiators include an α-hydroxyacetophenone compound and an oxime ester compound.

Colored Ink Composition

The ink composition of the present invention is preferably used as a colored ink composition, and in this case the ink composition comprises at least one type of colorant.

A pigment that may be used preferably as the colorant in the present invention is as follows.

The pigment is not particularly limited, and all generally commercially available organic pigments and inorganic pigments, resin particles colored with a dye, etc. may be used. Furthermore, it is possible to use a commercial pigment dispersion or a surface-treated pigment, for example, a dispersion in which a pigment is dispersed in an insoluble resin, etc. as a dispersion medium, or a pigment having a resin grafted on the surface, as long as the effects of the present invention are not impaired.

Examples of these pigments include pigments described in 'Ganryo no Jiten' (Pigment Dictionary) Ed. by Seishiro Ito (2000), W. Herbst, K. Hunger 'Industrial Organic Pigments', JP-A-2002-12607, JP-A-2002-188025, JP-A-2003-26978, and JP-A-2003-342503

Specific examples of the organic pigment and the inorganic pigment that can be used in the present invention include, as those exhibiting a yellow color, monoazo pigments such as C.I. Pigment Yellow 1 (Fast Yellow G, etc.) and C.I. Pigment Yellow 74, disazo pigments such as C.I. Pigment Yellow 12 (Disazo Yellow AAA, etc.) and C.I. Pigment Yellow 17, benzidine-free azo pigments such as C.I. Pigment Yellow 180 and C.I. Pigment Yellow 200 (Novoperm Yellow 2HG), azo lake pigments such as C.I. Pigment Yellow 100 (Tartrazine Yellow Lake, etc.), condensed azo pigments such as C.I. Pigment Yellow 95 (Azo Condensation Yellow GR, etc.), acidic dye lake pigments such as C.I. Pigment Yellow 115 (Quinoline Yellow Lake, etc.), basic dye lake pigments such as C.I. Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as C.I. Pigment Yellow 153 (Nickel Nitroso Yellow, etc.), and metal complex azomethine pigments such as C.I. Pigment Yellow 117 (Copper Azomethine Yellow, etc.).

Examples of pigments exhibiting a red or magenta color include monoazo pigments such as C.I. Pigment Red 3 (Toluidine Red, etc.), disazo pigments such as C.I. Pigment Red 38 (Pyrazolone Red B, etc.), azo lake pigments such as C.I. Pigment Red 53:1 (Lake Red C, etc.) and C.I. Pigment Red 57:1 (Brilliant Carmine 6B), condensed azo pigments such as C.I. Pigment Red 144 (Azo Condensation Red BR, etc.), acidic dye lake pigments such as C.I. Pigment Red 174 (Phloxine B Lake, etc.), basic dye lake pigments such as C.I. Pigment Red 81 (Rhodamine 6G' Lake, etc.), anthraquinone pigments such as C.I. Pigment Red 177 (Dianthraquinonyl Red, etc.), thioindigo pigments such as C.I. Pigment Red 88 (Thioindigo Bordeaux, etc.), perinone pigments such as C.I. Pigment Red 194 (Perinone Red, etc.), perylene pigments such as C.I. Pigment Red 149 (Perylene Scarlet, etc.), quinacridone pigments such as C.I. Pigment violet 19 (unsubstituted quinacridone, CINQUASIA Magenta RT-355T; Ciba Specialty Chemicals) and C.I. Pigment Red 122 (Quinacridone Magenta, etc.), isoindolinone pigments such as C.I. Pigment Red 180 (Isoindolinone Red 2BLT, etc.), and alizarin lake pigments such as C.I. Pigment Red 83 (Madder Lake, etc.).

Examples of pigments exhibiting a blue or cyan color include disazo pigments such as C.I. Pigment Blue 25 (Dianisidine Blue, etc.), phthalocyanine pigments such as C.I. Pigment Blue 15 and C.I. Pigment Blue 15:3 (IRGALITE BLUE GLO; Ciba Specialty Chemicals) (Phthalocyanine Blue, etc.), acidic dye lake pigments such as C.I. Pigment Blue 24 (Peacock Blue Lake, etc.), basic dye lake pigments such as C.I. Pigment Blue 1 (Victoria Pure Blue BO Lake, etc.), anthraquinone pigments such as C.I. Pigment Blue 60 (Indanthrone Blue, etc.), and alkali blue pigments such as C.I. Pigment Blue 18 (Alkali Blue V-5:1).

Examples of pigments exhibiting a green color include phthalocyanine pigments such as C.I. Pigment Green 7 (Phthalocyanine Green) and C.I. Pigment Green 36 (Phthalocyanine Green), and azo metal complex pigments such as C.I. Pigment Green 8 (Nitroso Green).

Examples of pigments exhibiting an orange color include isoindoline pigments such as C.I. Pigment Orange 66 (Isoindoline Orange) and anthraquinone pigments such as C.I. Pigment Orange 51 (Dichloropyranthrone Orange).

Examples of pigments exhibiting a black color include carbon black, titanium black, and aniline black. Examples of carbon black include SPECIAL BLACK 250 (Degussa).

Specific examples of white pigments that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the colorant, for example, dispersing equipment such as a bead mill, a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

When carrying out dispersion of the colorant, a dispersant such as a surfactant may be added.

Furthermore, when adding the colorant, as a dispersion adjuvant it is also possible to use as a necessary a synergist, depending on the various types of pigment. The dispersion adjuvant is preferably used in a range of at least 1 but no greater than 50 parts by weight relative to 100 parts by weight of the colorant.

In the ink composition, as a dispersion medium for various components such as the colorant, a solvent may be added, or the polymerizable compound, which is a low molecular weight component, may be used as a dispersion medium without using a solvent, and since the ink composition is a radiation curing type liquid, and after the ink composition is applied on top of a recording medium it is cured, it is preferable not to use a solvent. This is because, if a solvent remains in an image formed from the cured ink composition, the solvent resistance is degraded and the VOC (Volatile Organic Compound) problem of residual solvent occurs. From this viewpoint, it is preferable to use the polymerizable compound as a dispersion medium and, in particular, it is preferable to select a polymerizable compound having the lowest viscosity in terms of improvement of the dispersion suitability and the handling properties of the ink composition.

The average particle size of the colorant used here is preferably at least 0.01 μm but no greater than 0.4 μm, and more preferably at least 0.02 μm but no greater than 0.2 μm, since the finer it is the better the coloring properties. In order to make the maximum particle size be no greater than 3 μm, and preferably no greater than 1 μm, the colorant, the dispersant, and the dispersion medium are selected, and dispersion conditions and filtration conditions are set. By such control of particle size, clogging of a head nozzle can be suppressed, and the storage stability of the ink composition, and the transparency and the curing sensitivity of the ink composition can be maintained. In the present invention, by using a dispersant having excellent dispersing properties and stability, it is possible to obtain a uniform and stable dispersion even if a microparticulate colorant is used.

The particle size of the colorant in the ink composition may be measured by a known measurement method. Specifically, it may be measured by a centrifugal sedimentation light transmission method, an X-ray transmission method, a laser diffraction/scattering method, or a dynamic light scattering method. In the present invention, a value obtained by measurement employing a laser diffraction/scattering method is used.

Surfactant

It is preferable for the ink composition to comprise a surfactant.

The surfactant that is used in the present invention is exemplified by those below. For example, those described in JP-A-62-173463 and JP-A-62-183457 can be cited. Specific examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. An organofluoro compound may be used as the above-mentioned known surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The surfactant used in the present invention is not particularly limited to the above surfactants, and may be an additive that has the ability to reduce surface tension efficiently relative to the concentration thereof added.

Other Additives

The ink composition of the present invention may comprise, in addition to the polymerizable compound and the polymerization initiator, various types of additives according to the intended application. For example, from the viewpoint of improving weatherability of an image obtained, a UV absorber may be used. Moreover, in order to improve the stability of the ink composition, an antioxidant may be added.

Furthermore, it is possible to add various types of organic and metal complex-based discoloration preventing agents, conductive salts such as potassium thiocyanate, lithium nitrate, ammonium thiocyanate, and dimethylamine hydrochloride for the purpose of controlling discharge properties, and a trace amount of an organic solvent in order to improve adhesion between the ink composition and a substrate.

Moreover, in order to adjust coating physical properties, various types of polymer compound may be added. Examples of the polymer compound include an acrylic polymer, a polyvinylbutyral resin, a polyurethane resin, a polyamide resin, a polyester resin, an epoxy resin, a phenol resin, a polycarbonate resin, a polyvinylbutyral resin, a polyvinylformal resin, a shellac, a vinylic resin, an acrylic resin, a rubber-based resin, a wax, and other natural resins. They may be used in a combination of two or more types.

In addition to the above, the ink composition of the present invention may contain as necessary a leveling additive, a matting agent, a wax for adjusting coating physical properties, a tackifier that does not inhibit polymerization in order to improve the adhesion to a polyolefin or PET, etc.

The ink composition of the present invention may preferably be used in an inkjet recording method.

Inkjet Recording Method

The inkjet recording method of the present invention and an inkjet recording system that can be applied to the method are now explained.

The inkjet recording method of the present invention is a method in which the ink composition of the present invention is discharged onto a recording medium (support, recording material, etc.) for inkjet recording, and the ink composition discharged onto the recording medium is irradiated with actinic radiation so as to cure the ink composition and form an image.

That is, the inkjet recording method of the present invention comprises (a) a step of discharging the ink composition of the present invention onto a recording medium, and (b) a step of curing the ink composition by irradiating the discharged ink composition with actinic radiation.

Since the inkjet recording method of the present invention comprises steps (a) and (b) above, an image is formed by the ink composition cured on a recording medium.

Step (a) of the inkjet recording method of the present invention may employ an inkjet recording system, which is described in detail below.

Inkjet Recording System

The inkjet recording system used in the recording method of the present invention is not particularly limited, and a known inkjet recording system that can achieve a target resolution may be freely selected and used. That is, any known inkjet recording system, including a commercial system, may be used for carrying out ink discharge onto a recording medium in step (a) of the inkjet recording method of the present invention.

Examples of the inkjet recording system that can be used in the present invention include a system that comprises an ink supply system, a temperature sensor, and an actinic radiation source.

The ink supply system comprises, for example, a main tank containing the ink composition of the present invention, a supply pipe, an ink supply tank immediately before an inkjet head, a filter, and a piezo type inkjet head. The piezo type inkjet head is driven so as to discharge multisize dots of preferably 1 to 100 pL, and more preferably 8 to 30 pL, at a resolution of preferably 320×320 to 4,000×4,000 dpi, more preferably 400×400 to 1,600×1,600, and particularly preferably 720×720 dpi. Here, dpi referred to in the present invention denotes the number of dots per 2.54 cm.

As described above, with regard to a radiation curing type ink, since it is desirable that an ink that is discharged has a constant temperature, a section from the ink supply tank to the inkjet head may be insulated and heated. A method for temperature control is not particularly limited, and it is preferable to provide, for example, a plurality of temperature sensors at each pipe section and control heating according to ink flow rate and environmental temperature. The temperature sensors may be provided at the ink supply tank and in the vicinity of an inkjet head nozzle. Furthermore, it is preferable that a head unit that is heated is thermally shielded or insulated so that the system main body is not affected by the outside temperature. In order to reduce the printer start-up time required for heating or suppress loss of thermal energy, it is preferable to thermally insulate the heating unit from other sections and decrease the overall thermal capacity thereof.

The step (b) of curing the ink composition by irradiating the discharged ink composition with actinic radiation is now explained.

The ink composition discharged onto a recording medium cures upon exposure to actinic radiation. This is because a polymerization initiator contained in the ink composition of the present invention decomposes upon exposure to actinic radiation and generates an initiating species such as a radical, an acid, or a base, and the initiating species functions so as to cause and promote a polymerization reaction of a specific monofunctional (meth)acrylic acid derivative or another polymerizable compound that is used in combination as required, thus curing the ink composition. In this process, if a sensitizer is present together with the polymerization initiator in the ink composition, the sensitizer in the system absorbs actinic radiation, attains an excited state, and by contacting the polymerization initiator promotes decomposition of the polymerization initiator, thus achieving a curing reaction with high sensitivity.

The actinic radiation used here is α rays, γ rays, an electron beam, X-rays, ultraviolet rays, visible light, or infrared light. The peak wavelength of actinic radiation depends on the absorption characteristics of the sensitizer and, for example, is preferably 200 to 600 nm, more preferably 300 to 450 nm, and yet more preferably 350 to 420 nm.

Furthermore, in the present invention, the polymerization initiator system has sufficient sensitivity for low output actinic radiation. Therefore, the output of the actinic radiation is preferably no greater than 2,000 mJ/cm$^2$, more preferably 10 to 2,000 mJ/cm$^2$, yet more preferably 20 to 1,000 mJ/cm$^2$, and particularly preferably 50 to 800 mJ/cm$^2$.

Moreover, the actinic radiation is, for example, suitably 10 to 2,000 mW/cm$^2$, and preferably 20 to 1,000 mW/cm$^2$ as an exposure area illumination intensity.

As an actinic radiation source, a mercury lamp, a gas/solid laser, etc. are mainly used, and as a light source used for curing a UV photocuring inkjet recording ink a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is required, a UV-LED or a UV-LD may be used.

The ink composition of the present invention is desirably exposed to such actinic radiation preferably for 0.01 to 120 sec, and more preferably 0.1 to 90 sec.

Irradiation conditions for the actinic radiation and basic irradiation methods are disclosed in JP-A-60-132767. Specifically, light sources are provided on opposite sides of a head unit comprising an ink discharge system, and the head unit and the light sources are made to scan by a so-called shuttle system. Irradiation with actinic radiation is carried out after a fixed period of time (preferably 0.01 to 0.5 sec, more preferably 0.01 to 0.3 sec, and particularly preferably 0.01 to 0.15 sec) has elapsed after the ink has landed. By controlling the time from after the ink has landed until before the irradiation so that it is a very short time, it is possible to prevent the ink that has landed on a recording medium from spreading before being cured. Furthermore, when a porous recording medium is used, since exposure can be carried out before ink penetrates to a deep part where the light source cannot reach, it is possible to reduce residual unreacted monomer.

Moreover, curing may be completed by another light source that is not driven. International patent application WO 99/54415 discloses as an irradiation method a method employing optical fiber or a method in which a collimated light source is applied to a mirror surface provided on a side face of a head unit and a recording area is irradiated with UV rays, and such a curing method can also be applied to the recording method of the present invention.

By employing the above-mentioned inkjet recording method, it is possible to keep the diameter of landed ink dots constant even for various recording media having different surface wettability, thus improving the image quality. In order to obtain a color image, it is preferable to overlap in order from low lightness colors. By overlapping in order from low lightness inks, it becomes easy for radiation to reach ink in a lower part, and good curing sensitivity, reduction of residual monomer, and improvement in adhesion can be expected. Although it is possible to carry out irradiation all at once after all colors are discharged, it is preferable in terms of promoting curing that exposure to light is carried out for each color.

In this way, the ink composition of the present invention cures with high sensitivity upon exposure to actinic radiation, and a hydrophobic image is formed on the surface of a recording medium.

The source of actinic radiation used for curing the ink and preferred irradiation conditions therefor are also the same as those described for the inkjet recording method.

The ink composition of the present invention is cured with high sensitivity by actinic radiation, and can form a hydrophobic region that has excellent coating properties and adhesion to a support. Because of this, in addition to formation of a colored image or marking, it may be used for the formation of, for example, an image area of a lithographic printing plate, and by using it in this application, a lithographic printing plate having high image quality and excellent plate life can be obtained.

The ink composition of the present invention is excellent for inkjet recording because of the above-mentioned reasons, but is of course useful as an ink composition for general use.

The ink composition may be liquid at room temperature, but from the viewpoint of suitability for firing droplets by inkjet, it is preferable that the viscosity at 25° C. is no greater than 100 mPa·s or the viscosity at 60° C. is no greater than 30 mPa·s; it is more preferable that the viscosity at 25° C. is no greater than 60 mPa·s or the viscosity at 60° C. is no greater than 20 mPa·s, and it is particularly preferable that the viscosity at 25° C. is no greater than 40 mPa·s or the viscosity at 60° C. is no greater than 15 mPa·s.

Similarly, from the viewpoint of suitability for firing droplets by inkjet, the surface tension at 25° C. of the ink composition is preferably at least 18 mN/m but no greater than 40 mN/m, more preferably at least 20 mN/m but no greater than 35 mN/m, and yet more preferably at least 22 mN/m but no greater than 32 mN/m.

The 'viscosity' referred to here is a viscosity determined using a model RE80 viscometer manufactured by Toki Sangyo Co., Ltd. The model RE80 viscometer is a conical rotor/flat plate system E-type viscometer, and measurement is carried out at a rotational speed of 10 rpm using a rotor code No. 1 rotor. For those having a viscosity of higher than 60 mPa·s, measurement was carried out by changing the rotational speed as necessary to 5 rpm, 2.5 rpm, 1 rpm, 0.5 rpm, etc.

The surface tension referred to above is a value obtained by measuring at a liquid temperature of 25° C. by the Wilhelmy method using a standard surface tensiometer (e.g. a CBVP-Z surface tensiometer manufactured by Kyowa Interface Science Co., Ltd.).

EXAMPLES

The present invention is explained in detail below by reference to Examples, but the present invention should not be construed as being limited thereto.

Preparation of Pigment Dispersions

Components shown in Table 1 were mixed, and stirred using a stirrer for 1 hour. After stirring, the mixture was dispersed by means of bead mill dispersion, thus giving a pigment dispersion. Dispersion was carried out under conditions of 0.65 mm diameter zirconia beads packed at a packing ratio of 70%, a peripheral speed of 9 m/s, and a dispersion time of 2 to 4 hours.

The compositions of the pigment dispersions are shown in Table 1.

TABLE 1

| | Cyan pigment A | Magenta pigment A | Yellow pigment A | Carbon black | Titanium dioxide | Dispersant A | Dispersant B | Polymerizable compound A |
|---|---|---|---|---|---|---|---|---|
| Cyan pigment dispersion A | 30 parts by weight | | | | | 20 parts by weight | | 50 parts by weight |
| Magenta pigment dispersion A | | 30 parts by weight | | | | 20 parts by weight | | 50 parts by weight |
| Yellow pigment dispersion A | | | 30 parts by weight | | | 20 parts by weight | | 50 parts by weight |
| Black pigment dispersion A | | | | 40 parts by weight | | 25 parts by weight | | 35 parts by weight |
| White pigment dispersion A | | | | | 60 parts by weight | | 5 parts by weight | 35 parts by weight |

Cyan pigment A: PB 15:3 (IRGALITE BLUE GLO; Ciba Specialty Chemicals)
Magenta pigment RT-A: PV 19 (CINQUASIA MAGENTA RT-355D; Ciba Specialty Chemicals)
Yellow pigment A: PY 120 (NOVOPERM YELLOW H2G; Clariant)
Carbon black: SPECIAL BLACK 250 (Degussa)
Titanium dioxide: CR60-2 (Ishihara Sangyo Kaisha Ltd.)
Dispersant A: BYK-168 (BYK-Chemie)
Dispersant B: Solsperse 36000 (Noveon)
Polymerizable compound A: PEA (phenoxyethyl acrylate; Dai-ichi Kogyo Seiyaku Co., Ltd.)

Preparation of Liquid Compositions

The compositions of ink sets 1 to 9 are shown in Tables 2 to 10 respectively.

The components shown in Table 2 (units: g) were mixed and dissolved by stirring, thus giving a liquid composition.

TABLE 2

| | Ink composition | | | | |
|---|---|---|---|---|---|
| Composition (parts by weight) | M1 | C1 | Y1 | W1 | Bk1 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 34.6 | 46.9 | 38.5 | 44.1 | 44.1 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |

TABLE 2-continued

| Composition (parts by weight) | Ink composition | | | | |
|---|---|---|---|---|---|
| | M1 | C1 | Y1 | W1 | Bk1 |
| Sensitizer A | 1.5 | 1.5 | 1.5 | 1.5 | 1.5 |
| Sensitizer D | 3.2 | 3.2 | 3.2 | 3.2 | 3.2 |

TABLE 3

| Composition (parts by weight) | Ink composition | | | | |
|---|---|---|---|---|---|
| | M2 | C2 | Y2 | W2 | Bk2 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 34.3 | 46.6 | 38.2 | 43.8 | 43.8 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |
| Sensitizer B | 1.8 | 1.8 | 1.8 | 1.8 | 1.8 |
| Sensitizer D | 3.2 | 3.2 | 3.2 | 3.2 | 3.2 |

TABLE 4

| Composition (parts by weight) | Ink composition | | | | |
|---|---|---|---|---|---|
| | M3 | C3 | Y3 | W3 | Bk3 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 34.3 | 46.6 | 38.2 | 43.8 | 43.8 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |
| Sensitizer C | 1.8 | 1.8 | 1.8 | 1.8 | 1.8 |
| Sensitizer D | 3.2 | 3.2 | 3.2 | 3.2 | 3.2 |

TABLE 5

| Composition (parts by weight) | Ink composition | | | | |
|---|---|---|---|---|---|
| | M4 | C4 | Y4 | W4 | Bk4 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 34.5 | 46.8 | 38.4 | 44.0 | 44.0 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |
| Sensitizer C | 1.8 | 1.8 | 1.8 | 1.8 | 1.8 |
| Sensitizer E | 3.0 | 3.0 | 3.0 | 3.0 | 3.0 |

TABLE 6

| Composition (parts by weight) | Ink composition | | | | |
|---|---|---|---|---|---|
| | M5 | C5 | Y5 | W5 | Bk5 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 37.8 | 50.1 | 41.7 | 47.3 | 47.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |
| Sensitizer A | 1.5 | 1.5 | 1.5 | 1.5 | 1.5 |

TABLE 7

| Composition (parts by weight) | Ink composition | | | | |
|---|---|---|---|---|---|
| | M6 | C6 | Y6 | W6 | Bk6 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 31.3 | 43.6 | 35.2 | 40.8 | 40.8 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |
| Sensitizer A | 8.0 | 8.0 | 8.0 | 8.0 | 8.0 |

TABLE 8

| Composition (parts by weight) | Ink composition | | | | |
|---|---|---|---|---|---|
| | M7 | C7 | Y7 | W7 | Bk7 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 36.1 | 48.4 | 40.0 | 45.6 | 45.6 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |
| Sensitizer D | 3.2 | 3.2 | 3.2 | 3.2 | 3.2 |

TABLE 9

| Composition (parts by weight) | Ink composition | | | | |
|---|---|---|---|---|---|
| | M8 | C8 | Y8 | W8 | Bk8 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 32.8 | 45.1 | 36.7 | 42.3 | 42.3 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |

TABLE 9-continued

| Composition (parts by weight) | Ink composition | | | | |
|---|---|---|---|---|---|
| | M8 | C8 | Y8 | W8 | Bk8 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |
| Sensitizer D | 6.5 | 6.5 | 6.5 | 6.5 | 6.5 |

TABLE 10

| Composition (parts by weight) | Ink composition | | | | |
|---|---|---|---|---|---|
| | M9 | C9 | Y9 | W9 | Bk9 |
| Magenta pigment dispersion A | 19.5 | — | — | — | — |
| Cyan pigment dispersion A | — | 7.2 | — | — | — |
| Yellow pigment dispersion A | — | — | 15.6 | — | — |
| White pigment A | — | — | — | 10.0 | — |
| Black pigment A | — | — | — | — | 10.0 |
| Polymerizable compound A | 39.3 | 51.6 | 43.2 | 48.8 | 48.8 |
| Polymerizable compound B | 30.0 | 30.0 | 30.0 | 30.0 | 30.0 |
| Polymerizable compound C | 1.0 | 1.0 | 1.0 | 1.0 | 1.0 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 2.0 | 2.0 | 2.0 | 2.0 | 2.0 |
| Initiator B | 8.0 | 8.0 | 8.0 | 8.0 | 8.0 |

Polymerizable compound A: PEA (phenoxyethyl acrylate; Dai-ichi Kogyo Seiyaku Co., Ltd.)
Polymerizable compound B: DPGDA (dipropylene glycol diacrylate; Daicel-Cytec Company Ltd.)
Polymerizable compound C: A-TMPT (trimethylolpropane triacrylate; Shin-Nakamura Chemical Co., Ltd.)
Surfactant A: BYK-307 (surfactant, BYK-Chemie)
Polymerization inhibitor A: FIRSTCURE ST-1 (Albemarle)
Initiator A: bis(2,4,6-trimethylbenzoyl)phenylphosphine oxide (acylphosphine oxide)
Initiator B: 2-methyl-1-(4-methylthiophenyl)-2-morpholinopropan-1-one
Sensitizer A: Chemical formula A below
Sensitizer B: Chemical formula B below
Sensitizer C: Chemical formula C below
Sensitizer D: Chemical formula D below
Sensitizer E: Chemical formula E below

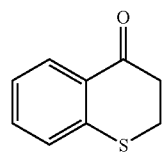

Sensitizer A

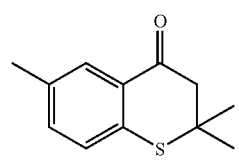

Sensitizer B

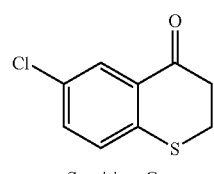

Sensitizer C

TABLE 10-continued

| Composition (parts by weight) | Ink composition | | | | |
|---|---|---|---|---|---|
| | M9 | C9 | Y9 | W9 | Bk9 |

Sensitizer D

Sensitizer E

Absorption maximum wavelengths in the wavelength range of 300 to 400 nm of the sensitizers measured by a spectrophotometer (V560 spectrophotometer, JASCO Corporation) are given in Table 11. As a solvent, propylene glycol monomethyl ether was used, and measurement was carried out by dilution to 0.001 wt %. Table 11 shows the maximum absorption wavelengths λmax of the sensitizers.

TABLE 11

| | λmax |
|---|---|
| Sensitizer A | 347 nm |
| Sensitizer B | 357 nm |
| Sensitizer C | 358 nm |
| Sensitizer D | 387 nm |
| Sensitizer E | 384 nm |

Image Recording System

An inkjet printer (equipped with heads manufactured by Toshiba Tec Corporation having a droplet firing frequency of 6.2 KHz, a number of nozzles of 636, a nozzle density of 300 npi (nozzles/inch, the same applies below), and a drop size variable in 7 stages from 6 pL to 42 pL with two heads arranged to give 600 npi, five sets of these heads being arranged in a full line as a head set) was charged with five of the colored ink compositions (M1 to M9, C1 to C9, Y1 to Y9, Bk1 to Bk9, W1 to W9) prepared above.

The construction was such that a recording medium could be moved immediately beneath the heads, and the heads were fixed to a machine body in the order white, yellow, cyan, magenta, and black from upstream in the transport direction of the recording medium.

Five metal halide lamps (light intensity 3,000 mW/cm$^2$) were installed downstream of the black ink head. The irradiation energy of the metal halide lamps could be adjusted from 300 to 1,500 mJ/cm$^2$ by the number of metal halide lamps that were switched ON. Specifically, 300 mJ/cm$^2$ (1 lamp ON), 600 mJ/cm$^2$ (2 lamps ON), 900 mJ/cm$^2$ (3 lamps ON), 1,200 mJ/cm$^2$ (4 lamps ON), and 1,500 mJ/cm$^2$ (5 lamps ON).

The recording medium was transported by roll transfer, and a 600 dpi×600 dpi image was formed on a recording medium. As the recording medium, plastic film A (white polyethylene) and plastic film B (transparent polyethylene) were used. They were subjected to a corona discharge treatment before printing so that the surface energy of the substrate was no greater than 30 mN/m.

Example 1

An image was formed on plastic film A (white polyethylene) and plastic film B (transparent polyethylene) using the above-mentioned image recording system in accordance with the procedure described below, thus giving a printed material.
(1) A white colored liquid (W1) was applied by the white head on top of a recording medium, thus forming a white image.
(2) A yellow colored liquid (Y1) was applied by the yellow head on top of the recording medium, thus forming a yellow image.
(3) A cyan colored liquid (C1) was applied by the cyan head on top of the recording medium, thus forming a cyan image.
(4) A magenta colored liquid (M1) was applied by the magenta head on top of the recording medium, thus forming a magenta image.
(5) A black colored liquid (Bk1) was applied by the black head on top of the recording medium, thus forming a black image.
(6) Exposure to light was carried out using the metal halide lamps (light intensity 3,000 mW/cm$^2$), thus completely curing the image. The exposure energy was adjusted from 300 to 1,500 mJ/cm$^2$ by the number of metal halide lamps switched ON.

The transport speed for the recording medium here was 400 mm/s, and the amount of colored liquid per dot was about 12 pL. When plastic film A was used, step (1) for applying white ink were omitted.

Examples 2 to 4 and Comparative Examples 1 to 5

Recorded materials (images) were formed in the same manner as in Example 1 except that the colored liquids were changed as described in Table 12.

Evaluation Items

Curability Test

Curability was defined as the exposure energy at which tackiness on the printed surface disappeared.

The presence or absence of tackiness of the printed surface was determined by pressing plain paper (Photocopy paper C2, manufactured by Fuji Xerox Co., Ltd.) thereagainst immediately after printing; when the colored liquid transferred, tackiness was present, and when there was no transfer, tackiness was absent.

The exposure energy was changed between 300 mJ/cm$^2$, 600 mJ/cm$^2$, 900 mJ/cm$^2$, 1,200 mJ/cm$^2$, and 1,500 mJ/cm$^2$, and evaluation was made in accordance with the criteria below.

The curability was evaluated using printed material A (FIG. 1A). In FIG. 1A, 400 denotes a solid printed area formed using a primary color (cyan, magenta, yellow, black, or white), and a primary color solid image was printed at a pixel density of 600×600 dpi by applying 12 pL liquid droplets of the colored liquid per pixel. 401 denotes an area where no ink was applied, and the substrate was exposed on the surface.

5: no tackiness observed with exposure at 300 mJ/cm$^2$.
4: no tackiness observed with exposure at 600 mJ/cm$^2$.
3: no tackiness observed with exposure at 900 mJ/cm$^2$.
2: no tackiness observed with exposure at 1,200 mJ/cm$^2$.
1: no tackiness observed with exposure at 1,500 mJ/cm$^2$.

The results of the curability test are given in Table 12. The lower the tack-free sensitivity, the more preferable from the viewpoint of curability, and it is particularly preferable that it is no greater than 600 mJ/cm$^2$ (5 or 4).

Blocking Test

A printed surface and a substrate surface were superimposed, after a fixed period of time had elapsed they were peeled apart, and the presence of tearing of the coating on the printed surface or transfer to the substrate surface was evaluated.

All of the printed materials used in the blocking test were exposed at an exposure energy of 1,500 mJ/cm$^2$. When storing the printed material, the printed surface and the substrate surface were superimposed, and a uniform load (1 kg/cm$^2$) was applied to the entire printed material using a weight at room temperature for 24 hours. After 24 hours had elapsed, the printed surface and the substrate surface were peeled apart, and a visual evaluation was made in accordance with the criteria below.

3: No tearing of the coating on the printed surface, and no transfer of ink to the substrate surface.
2: Tearing or internal failure of the coating was observed in part of the printed surface or transfer of ink to the substrate surface was observed in part (the 'part' referred to here means less than 50% of the entire area)
1: Tearing or internal failure of the coating was observed in the whole area of the printed surface or transfer of ink to the substrate surface was observed in the whole area (the 'whole area' referred to here means at least 50% of the entire area) The results of the blocking test are given in Table 12. Here, from the viewpoint of curability, it is preferable that there is no tearing in the coating on the printed surface or transfer to the substrate surface, and only criterion 3 is acceptable.

TABLE 12

|  |  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|---|
|  |  |  |  |  |  | Ink set |  |  |  |  |
|  |  | 1 | 2 | 3 | 4 | 5 | 6 | 7 | 8 | 9 |
| Ink composition | Magenta head | M1 | M2 | M3 | M4 | M5 | M6 | M7 | M8 | M9 |
|  | Cyan head | 01 | C2 | C3 | C4 | C5 | C6 | C7 | C8 | C9 |
|  | Yellow head | Y1 | Y2 | Y3 | Y4 | Y5 | Y6 | Y7 | Y8 | Y9 |
|  | White head | W1 | W2 | W3 | W4 | W5 | W6 | W7 | W8 | W9 |
|  | Black head | Bk1 | Bk2 | Bk3 | Bk4 | Bk5 | Bk6 | Bk7 | Bk8 | Bk9 |

TABLE 12-continued

|  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|
|  |  |  |  |  | Ink set |  |  |  |  |
|  | 1 | 2 | 3 | 4 | 5 | 6 | 7 | 8 | 9 |
| Curability test | 5 | 5 | 5 | 5 | 3 | 4 | 3 | 4 | 1 |
| Blocking test | 3 | 3 | 3 | 3 | 3 | 1 | 3 | 1 | 3 |

This suggests that, in order to obtain a preferred curability (irradiation energy to make tackiness disappear is no greater than 600 mJ/cm$^2$), it is necessary to use compound A represented by Formula (I) above and compound B represented by Formula (II) above in combination, or to increase the concentration of compound A or compound B added when used on their own. However, when the concentration of compound A or compound B added is increased, since blocking occurs this is not preferable.

It is clear from the above that, in order to give good curability and form an image causing no blocking, it is effective to add both compound A and compound B.

What is claimed is:

1. An ink composition comprising:
   compound A represented by Formula (I) below;
   compound B represented by Formula (II) below; and
   a polymerizable compound,

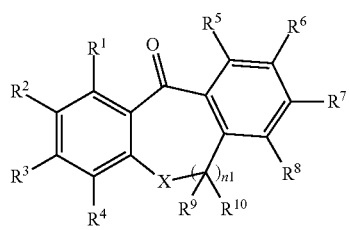

(I)

wherein X denotes O, S, or NR$^a$, n1 denotes 0 or 1, R$^a$, R$^1$, R$^2$, R$^3$, R$^4$, R$^5$, R$^6$, R$^7$, R$^8$, R$^9$, and R$^{10}$ independently denote a hydrogen atom or a monovalent substituent, and two of R$^1$, R$^2$, R$^3$, R$^4$, R$^5$, R$^6$, R$^7$, and R$^8$ that are adjacent may be linked to each other to form a ring, and

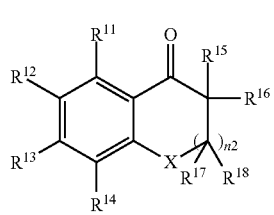

(II)

wherein X denotes O, S, or NR$^b$, n2 denotes 0 or 1, R$^b$, R$^{11}$, R$^{12}$, R$^{13}$, R$^{14}$, R$^{15}$, R$^{16}$, R$^{17}$, and R$^{18}$ independently denote a hydrogen atom or a monovalent substituent, and two of R$^{11}$, R$^{12}$, R$^{13}$, and R$^{14}$ that are adjacent may be linked to each other to form a ring.

2. The ink composition according to claim 1, wherein it further comprises a photopolymerization initiator.

3. The ink composition according to claim 2, wherein the photopolymerization initiator is at least one type of compound selected from the group consisting of an acylphosphine oxide compound and an α-aminoacetophenone compound.

4. The ink composition according to claim 1, wherein compound A represented by Formula (I) and compound B represented by Formula (II) have a light absorption maximum in the wavelength range of 300 to 400 nm, and an absorption maximum wavelength λmax (A) of compound A and an absorption maximum wavelength λmax (B) of compound B satisfy the relationship $$10 \text{ nm} < (\lambda\max(A) - \lambda\max(B)) < 50 \text{ nm},$$

where if compound A and/or compound B have two or more absorption maxima in the wavelength range of 300 to 400 nm, λmax (A) and/or λmax (B) are specified as being the absorption maximum on the longest wavelength side.

5. The ink composition according to claim 1, wherein the polymerizable compound is an ethylenically unsaturated compound.

6. The ink composition according to claim 1, wherein the polymerizable compound is a (meth)acrylic acid ester.

7. The ink composition according to claim 1, wherein the molar concentration of compound B represented by Formula (II) contained in the ink composition is higher than the molar concentration of compound A represented by Formula (I) contained in the ink composition.

8. The ink composition according to claim 1, wherein it further comprises a colorant.

9. An inkjet recording method comprising:
   (a) step of discharging the ink composition according to claim 1 onto a recording medium; and
   (b) a step of curing the ink composition by irradiating the discharged ink composition with actinic radiation.

* * * * *